US010359176B2

(12) United States Patent
Cha et al.

(10) Patent No.: US 10,359,176 B2
(45) Date of Patent: Jul. 23, 2019

(54) LIGHT GENERATING MEMBER, DISPLAY APPARATUS INCLUDING THE SAME, AND MANUFACTURING METHOD THEREOF

(71) Applicant: Samsung Display Co., Ltd., Yongin-Si, Gyeonggi-Do (KR)

(72) Inventors: Hanmoe Cha, Seoul (KR); Donghyeon Lee, Seoul (KR); Seokhyun Nam, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 91 days.

(21) Appl. No.: 15/367,722

(22) Filed: Dec. 2, 2016

(65) Prior Publication Data

US 2017/0205047 A1    Jul. 20, 2017

(30) Foreign Application Priority Data

Jan. 19, 2016    (KR) ........................ 10-2016-0006607

(51) Int. Cl.
| | |
|---|---|
| *F21V 9/00* | (2018.01) |
| *F21V 9/30* | (2018.01) |
| *F21K 9/64* | (2016.01) |
| *F21K 9/68* | (2016.01) |
| *F21V 7/04* | (2006.01) |

(Continued)

(52) U.S. Cl.
CPC ................. *F21V 9/30* (2018.02); *F21K 9/64* (2016.08); *F21K 9/68* (2016.08); *F21V 7/04* (2013.01); *F21V 13/08* (2013.01); *G02B 6/0023* (2013.01); *G02B 6/0031* (2013.01); *F21Y 2103/10* (2016.08); *F21Y 2115/10* (2016.08); *G02B 6/0091* (2013.01)

(58) Field of Classification Search
CPC .. G02B 6/0023; G02B 6/0026; G02B 6/0031; F21V 9/30; F21V 9/32; F21V 9/38; F21V 9/40; F21V 7/04; F21V 13/08; G09F 9/35; F21K 9/64; F21K 9/68
See application file for complete search history.

(56) References Cited

U.S. PATENT DOCUMENTS 7,611,274 B2 * 11/2009 Hsiao .................... G02B 6/009
                                                    362/613
9,261,710 B2 * 2/2016 Jain ...................... G02B 27/286
(Continued)

FOREIGN PATENT DOCUMENTS

| KR | 1020130022714 A | 3/2013 |
|---|---|---|
| KR | 1020140116652 A | 10/2014 |
| KR | 1020150093890 A | 8/2015 |

*Primary Examiner* — Matthew J. Peerce
(74) *Attorney, Agent, or Firm* — Cantor Colburn LLP

(57) ABSTRACT

A light generating member includes a light source which generates a first light, a light conversion member which converts the first light into a second light, a bottom portion which includes long sides facing each other and short sides which are connected to ends of the long sides and face each other, first sidewall portions which are connected to the long sides, extend in a direction crossing a plane of the bottom portion and face each other, and second sidewall portions which are connected to the first sidewall portions and face each other, where the light source is disposed between the bottom portion and the first sidewall portions, the light conversion member is disposed between the second sidewall portions, and the long sides have a predetermined curvature.

17 Claims, 20 Drawing Sheets

(51) Int. Cl.
*F21V 13/08* (2006.01)
*F21V 8/00* (2006.01)
*F21Y 103/10* (2016.01)
*F21Y 115/10* (2016.01)

(56) References Cited

U.S. PATENT DOCUMENTS

| | | | |
|---|---|---|---|
| 9,448,461 B2 * | 9/2016 | Park | G02F 1/353 |
| 9,470,920 B2 * | 10/2016 | Hsiao | G02F 1/133308 |
| 2010/0208494 A1 * | 8/2010 | Kuo | G02B 6/002 |
| | | | 362/612 |
| 2011/0096262 A1 * | 4/2011 | Kikuchi | G09F 9/35 |
| | | | 349/58 |
| 2012/0002427 A1 | 1/2012 | Moon et al. | |
| 2014/0036532 A1 * | 2/2014 | Lee | G02B 6/0021 |
| | | | 362/608 |
| 2014/0286049 A1 * | 9/2014 | Cha | G02F 1/133615 |
| | | | 362/609 |
| 2015/0009686 A1 * | 1/2015 | Pumyea | G02B 6/003 |
| | | | 362/341 |

* cited by examiner

LIGHT GENERATING MEMBER, DISPLAY APPARATUS INCLUDING THE SAME, AND MANUFACTURING METHOD THEREOF

This application claims priority to Korean Patent Application No. 10-2016-0006607, filed on Jan. 19, 2016, and all the benefits accruing therefrom under 35 U.S.C. § 119, the content of which in its entirety is herein incorporated by reference.

BACKGROUND

1. Field

Exemplary embodiments of the invention herein relate to light generating members, display apparatuses including the same, and methods of manufacturing the light generating member.

2. Description of the Related Art

In general, a liquid crystal display apparatus among display apparatuses includes a display panel, which includes a plurality of pixels generating an image, and a backlight unit providing light to the display panel. The pixels of the display panel display an image by adjusting transmittance of light provided from the backlight unit.

A light conversion member including quantum dots may be used to increase the efficiency of the light provided to the display panel. The light conversion member may have a bar shape or a disc shape and may be used in an edge-type backlight unit. The light conversion member may convert light having a predetermined color, which is provided from a light source, to white light. The light conversion member may convert blue light provided from the light source to white light, for example.

The white light generated by the light conversion member is provided to the display panel, and the pixels of the display panel may display an image by using the white light provided from the light conversion member.

SUMMARY

Exemplary embodiments of the invention provide a light generating member which may improve display quality by preventing color stains, and a display apparatus including the same.

Exemplary embodiments of the invention also provide a method of manufacturing a light generating member which may easily manufacture a light conversion member having a predetermined curvature.

An exemplary embodiment of the invention provides a light generating member including a light source which generates a first light, a light conversion member which converts the first light into a second light, a bottom portion which includes long sides facing each other and short sides connected to ends of the long sides to face each other, first sidewall portions which are connected to the long sides to extend in a direction crossing a plane of the bottom portion and face each other, and second sidewall portions connected to the first sidewall portions to face each other, where the light source is disposed between the bottom portion and the first sidewall portions, the light conversion member is disposed between the second sidewall portions, and the long sides have a predetermined curvature.

In an exemplary embodiment, the long sides may be curved with the predetermined curvature and extend along a first direction, the first and second sidewall portions may extend in a second direction crossing the first direction, and the short sides may extend in a third direction crossing the first and second directions.

In an exemplary embodiment, the light source may include a light source substrate which is curved with the predetermined curvature and extends along the first direction, and a plurality of light source units which are disposed on the light source substrate to generate the first light and are arranged in a direction having the predetermined curvature along the first direction.

In an exemplary embodiment, the first sidewall portions may include first sub-sidewall portions which are connected to the long sides and extend in the second direction, and second sub-sidewall portions which extend in the second direction to be connected to the first sub-sidewall portions and the second sidewall portions, where the light source substrate is disposed between the bottom portion and the first sub-sidewall portions, and the light source is disposed between the second sub-sidewall portions.

In an exemplary embodiment, a width of the second sub-sidewall portions in the second direction may be greater than a width of the plurality of light source units.

In an exemplary embodiment, a distance between inner surfaces of the first sub-sidewall portions, which are defined as surfaces of the first sub-sidewall portions facing each other, may be greater than a distance between inner surfaces of the second sub-sidewall portions which are defined as surfaces of the second sub-sidewall portions facing each other.

In an exemplary embodiment, the inner surfaces of the first sub-sidewall portions and the inner surfaces of the second sub-sidewall portions may be disposed parallel to the second direction.

In an exemplary embodiment, a distance between inner surfaces of the second sidewall portions, which are defined as surfaces of the second sidewall portions facing each other, may increase as farther from the first sidewall portions, and the inner surfaces of the second sidewall portions may have a concave curved shape along the second direction and are symmetrical to each other.

In an exemplary embodiment, the light generating member may further include reflective parts disposed on the inner surfaces of the second sidewall portions to reflect a light, where a hole is defined in a center portion of the bottom portion to penetrate through the bottom portion in the second direction, and cover parts which cover both sides of the first and second sidewall portions and the short sides in the first direction.

In an exemplary embodiment, each of the cover parts may include step difference portions which are recessed by a predetermined depth toward a rear surface of the cover parts, an opposite surface of a front surface of the cover parts, in a predetermined area of the front surface of the cover parts, and predetermined areas of both sides of the front surface of the cover parts, which include the step difference portion disposed therebetween in the third direction, may overlap one side of the second sidewall portions which is an opposite side of the other side of the second sidewall portions connected to the first sidewall portions.

In an exemplary embodiment, the light conversion member may be disposed lower than the step difference portions of the cover parts in a direction toward a bottom surface of the bottom portion which is an opposite surface of an inner surface of the bottom portion on which the light source is disposed.

In an exemplary embodiment, the light conversion member may include a first barrier layer, a second barrier layer which face the first barrier layer, and a quantum dot layer which is disposed between the first barrier layer and the second barrier layer and converts the first light into the second light, where the second barrier layer is adjacent to the light source.

In an exemplary embodiment, a rear surface of the second barrier layer, which is opposite to the first barrier layer in the second direction, may overlap a boundary between the first side wall portions and the second side wall portions.

In an exemplary embodiment, a plurality of first grooves which are recessed by a predetermined depth from inner surfaces of the second sidewall portions, which are defined as surfaces of the second sidewall portions facing each other, to outer surfaces of the second sidewall portions which are opposite surfaces of the inner surfaces of the second sidewall portions may be defined in the light generating member, and the light generating member may further include a plurality of metal parts disposed in the plurality of first grooves, and reflective parts disposed on the inner surfaces of the second sidewall portions excluding the plurality of first grooves.

In an exemplary embodiment, the plurality of first grooves may overlap the first and second barrier layers.

In an exemplary embodiment, a groove recessed from a bottom surface of the light conversion member facing the light source to a top surface of the light conversion member which is an opposite surface of the bottom surface of the light conversion member may be defined in the light conversion member, and the groove may be curved with the predetermined curvature and extends along the first direction.

In an exemplary embodiment, the groove may have a V-valley shape, a concave shape, or an inverted trapezoidal shape.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
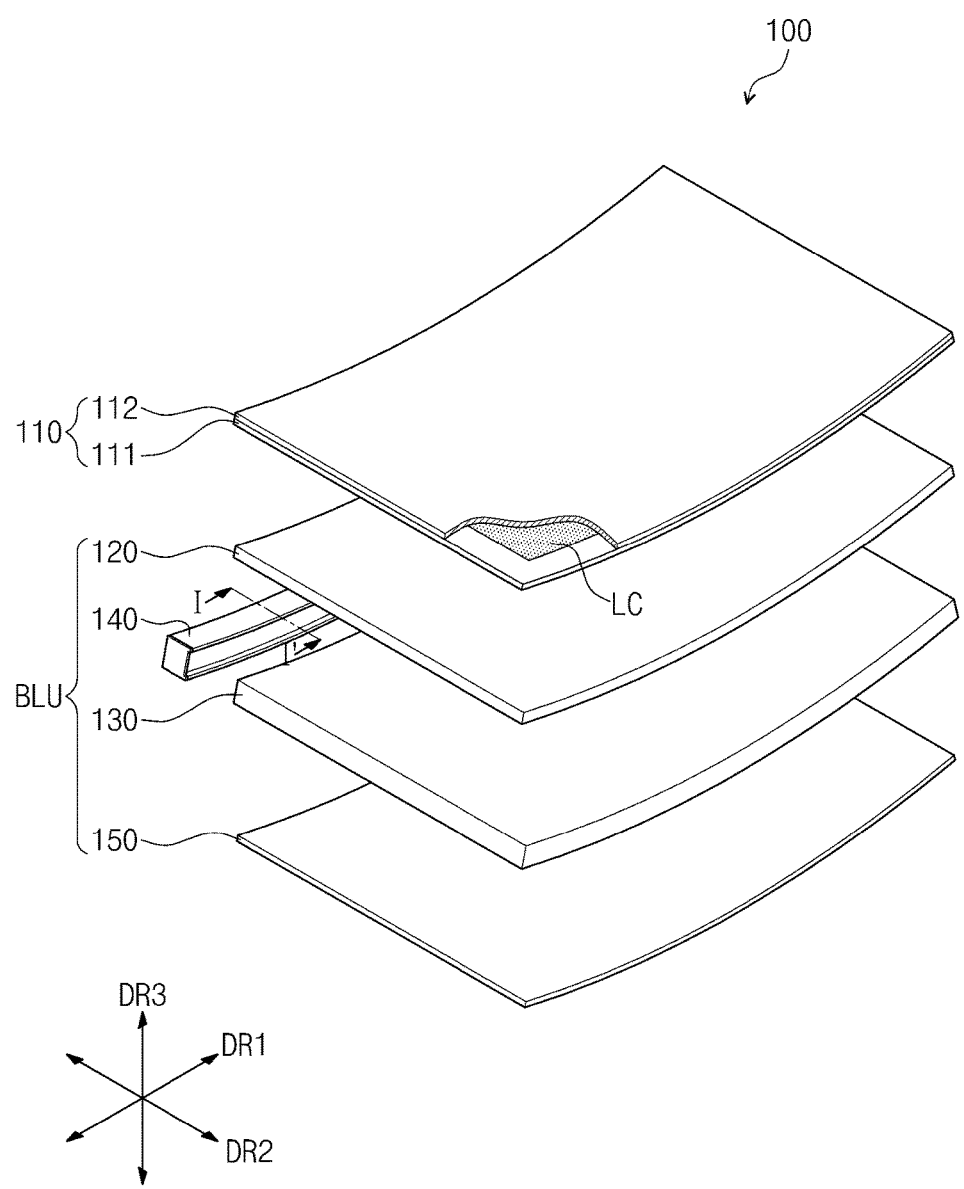
FIG. 1 is an exploded perspective view illustrating a display apparatus according to an exemplary embodiment of the invention.

Advantages and features of the invention, and implementation methods thereof will be clarified through following embodiments described with reference to the accompanying drawings. The invention may, however, be embodied in different forms and should not be construed as limited to the exemplary embodiments set forth herein. Rather, these embodiments are provided so that this invention will be thorough and complete, and will fully convey the scope of the invention to those skilled in the art. Further, the invention is only defined by scopes of claims. Like numbers refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. As used herein, the term "and/or" includes any and all combinations of one or more of the associated listed items.

Spatially relative terms, such as "below", "beneath", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. Like reference numerals refer to like elements throughout.

It will be understood that, although the terms first, second, etc. may be used herein to describe various elements, components, and/or sections, these elements, components, and/or sections should not be limited by these terms. These terms are only used to distinguish one element, component, or section from another element, component, or section. Thus, a first element, component, or section discussed below could be termed a second element, component, or section without departing from the teachings of the invention.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Additionally, the exemplary embodiment in the detailed description will be described with sectional views as ideal exemplary views of the invention. Accordingly, shapes of the exemplary views may be modified according to manufacturing techniques and/or allowable errors. Therefore, the exemplary embodiments of the invention are not limited to the specific shape illustrated in the exemplary views, but may include other shapes that may be created according to manufacturing processes. Areas exemplified in the drawings have general properties, and are used to illustrate a specific shape of a region of a device. Thus, this should not be construed as limited to the scope of the invention.

Hereinafter, exemplary embodiments of the invention will be described in detail with reference to the accompanying drawings.

Figure 2:
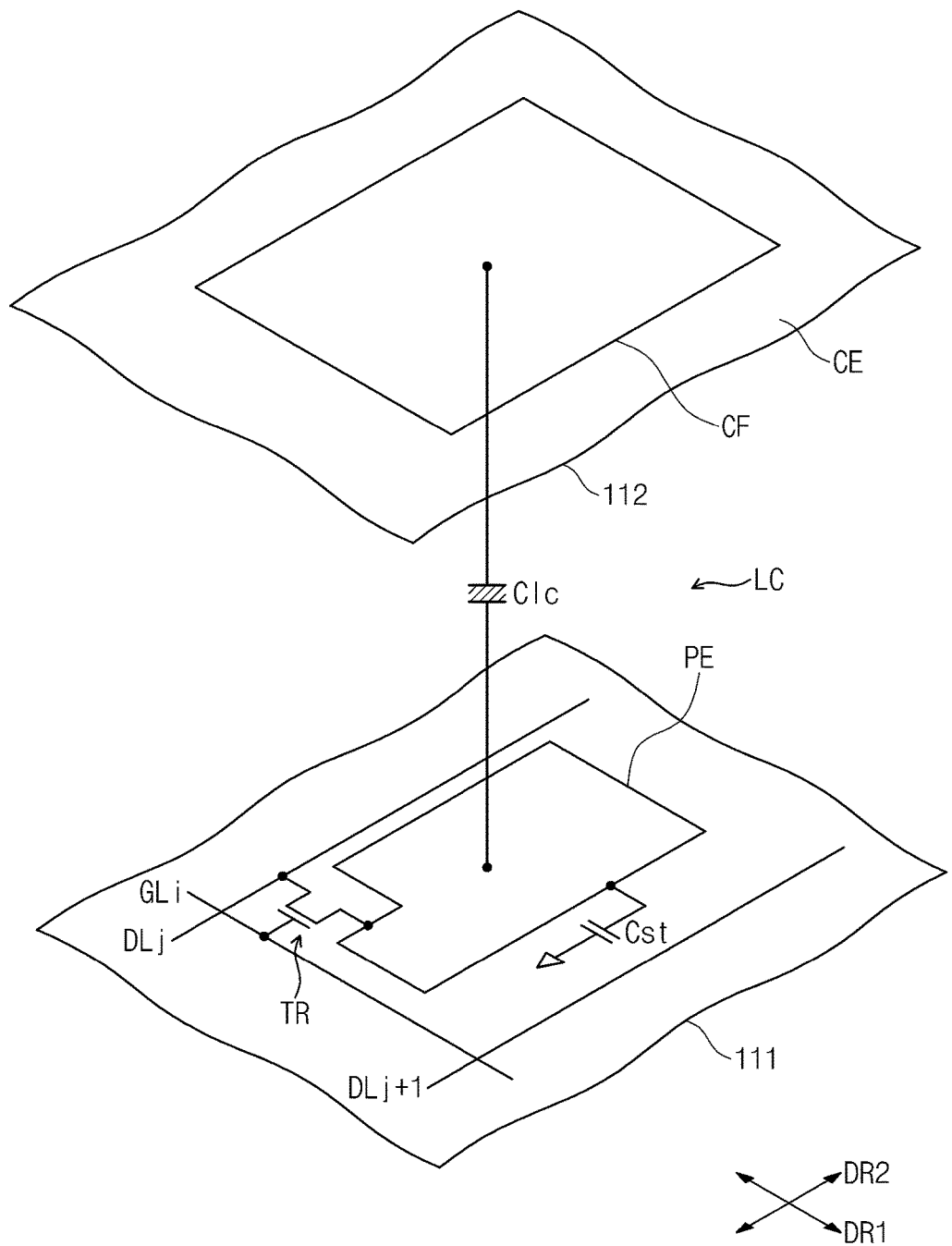
FIG. 2 is an equivalent circuit diagram of any one pixel among a plurality of pixels disposed on a display panel illustrated in FIG. 1.

FIG. 1 is an exploded perspective view illustrating a display apparatus according to an exemplary embodiment of the invention. FIG. 2 is an equivalent circuit diagram of any one pixel among a plurality of pixels disposed on a display panel illustrated in FIG. 1.

Referring to FIG. 1, a display apparatus 100 according to an exemplary embodiment of the invention may be a curved display apparatus having a curved shape. The display apparatus 100 is curved with a predetermined curvature and extends along a first direction DR1, and may have a flat shape in a second direction DR2 crossing the first direction DR1.

The display apparatus 100 includes a display panel 110 which displays an image using light, and a backlight unit BLU which generates light and provides the light to the display panel 110. The backlight unit BLU may be disposed at a rear of the display panel 110 to provide light to the display panel 110.

Although not shown in FIG. 1, the display panel 110 includes a plurality of pixels which display an image by using light. Each pixel may display one of primary colors. In an exemplary embodiment, the primary colors may include red, green, and blue, for example. However, the invention is not limited thereto, and the primary colors may further include various other colors such as white, yellow, cyan, and magenta.

The display panel 110 may be a liquid crystal display panel including a liquid crystal layer. In an exemplary embodiment, the display panel 110 may include a first substrate on which a plurality of pixels is disposed, a second substrate facing the first substrate, and a liquid crystal layer disposed between the first substrate and the second substrate.

In an exemplary embodiment, the backlight unit BLU may be an edge-type backlight unit, for example. The backlight unit BLU includes an optical sheet 120, a light guide plate 130, a light generating member 140, and a reflective sheet 150.

The display panel 110, the optical sheet 120, the light guide plate 130, the light generating member 140, and the reflective sheet 150 are curved with the predetermined curvature and extend along the first direction DR1, and may have a flat shape in the second direction DR2. The first and second directions DR1 and DR2 may be bidirectional.

The display panel 110, the optical sheet 120, the light guide plate 130, and the reflective sheet 150 may have long sides, which are curved with the predetermined curvature and extend along the first direction DR1 to face each other, and short sides which are connected to ends of the long sides and extend in the second direction DR2 to face each other.

The light generating member 140 is disposed to be adjacent to one side of the light guide plate 130 in the second direction DR2. The reflective sheet 150 is disposed under the light guide plate 130, and the optical sheet 120 is disposed above the light guide plate 130. The display panel 110 is disposed above the optical sheet 120.

The light generating member 140 generates light which is used in the display panel 110. The light generated in the light generating member 140 is provided to one side of the light guide plate 130 in the second direction DR2. The one side of the light guide plate 130 may be defined as a light entrance part.

The light guide plate 130 changes a propagation direction of the light provided from the light generating member 140 toward an upper direction in which the display panel 110 is disposed. The reflective sheet 150 reflects light, which is emitted under the light guide plate 130, in the upper direction.

In an exemplary embodiment, the optical sheet 120 includes a diffuser sheet (not shown) and a prism sheet (not shown) disposed above the diffuser sheet. The diffuser sheet may function to diffuse the light provided from the light guide plate 130.

The prism sheet may function to collect the light, which is diffused from the diffuser sheet, in the upper direction perpendicular to a plane. The light passing through the prism sheet proceeds in the upper direction and may be provided to the display panel 110 with a uniform brightness distribution.

The light generating member 140 generates a first light and emits a second light by converting the first light into the second light. In an exemplary embodiment, the first light may be light having a blue color (hereinafter, also referred to as "blue light"), and the second light may be light having a white color (hereinafter, also referred to as "white light"), for example. A specific configuration of the light generating member 140 will be described in detail below.

The second light generated from the light generating member 140 is guided in the upper direction by the light guide plate 130 and is diffused and collected by the optical sheet 120 to be provided to the display panel 110. The second light may be defined as the light generated from the light generating member 140 and the light generated from the backlight unit BLU.

Referring to FIG. 2, the display panel 110 includes a first substrate 111, a second substrate 112 facing the first substrate 111, and a liquid crystal layer LC disposed between the first substrate 111 and the second substrate 112.

A pixel includes a transistor TR connected to a gate line GLi and a data line DLj, a liquid crystal capacitor Clc connected to the transistor TR, and a storage capacitor Cst connected in parallel to the liquid crystal capacitor Clc where I and j are natural numbers. In another exemplary embodiment, the storage capacitor Cst may be omitted. The gate line GLi extends in the first direction DR1 and the data line DLj extends in the second direction DR2.

The transistor TR may be disposed on the first substrate 111. The transistor TR includes a gate electrode connected to the gate line GLi, a source electrode connected to the data line DLj, and a drain electrode connected to the liquid crystal capacitor Clc and the storage capacitor Cst.

The liquid crystal capacitor Clc includes a pixel electrode PE disposed on the first substrate 111, a common electrode CE disposed on the second substrate 112, and the liquid crystal layer LC disposed between the pixel electrode PE and the common electrode CE. The liquid crystal layer LC functions as a dielectric. The pixel electrode PE is connected to the drain electrode of the transistor TR.

Although the pixel electrode PE has a non-slit structure in FIG. 2, the invention is not limited thereto, and the pixel electrode PE may have a slit structure which includes a stem portion having a cross shape and a plurality of branch portions which radially extend from the stem portion.

The common electrode CE may be entirely disposed on the second substrate 112. However, the invention is not limited thereto, and the common electrode CE may be disposed on the first substrate 111. In this case, a slit may be defined in at least one of the pixel electrode PE and the common electrode CE.

The storage capacitor Cst may include the pixel electrode PE, a storage electrode (not shown) branched from a storage line (not shown), and an insulating layer disposed between the pixel electrode PE and the storage electrode. The storage line is disposed on the first substrate 111 and may be simultaneously provided on the same layer as the gate line GLi. The storage electrode may partially overlap the pixel electrode PE.

In an exemplary embodiment, the pixel may further include a color filter CF displaying one of red, green, and blue colors, for example. In an exemplary embodiment, the color filter CF may be disposed on the second substrate 112 as illustrated in FIG. 2. However, the invention is not limited thereto, and the color filter CF may be disposed on the first substrate 111.

The transistor TR is turned on in response to a gate signal which is provided through the gate line GLi. A data voltage received through the data line DLj is provided to the pixel electrode PE of the liquid crystal capacitor Clc through the turned-on transistor TR. A common voltage is applied to the common electrode CE.

An electric field is generated between the pixel electrode PE and the common electrode CE by a voltage level difference between the data voltage and the common voltage. Liquid crystal molecules of the liquid crystal layer LC are driven by the electric filed generated between the pixel electrode PE and the common electrode CE. Light transmittance may be adjusted by the liquid crystal molecules driven by the electric field, and thus, an image may be displayed.

A storage voltage having a constant voltage level may be applied to the storage line. However, the invention is not limited thereto, and the common voltage may be applied to the storage line. The storage capacitor Cst may function to supplement the voltage charged in the liquid crystal capacitor Clc.

Although the pixel connected to the gate line GLi and the data line DLj is illustrated in FIG. 2 for convenience of explanation, other pixels of the display panel 110 may also have the same configuration as the pixel illustrated in FIG. 2.

Figure 3:
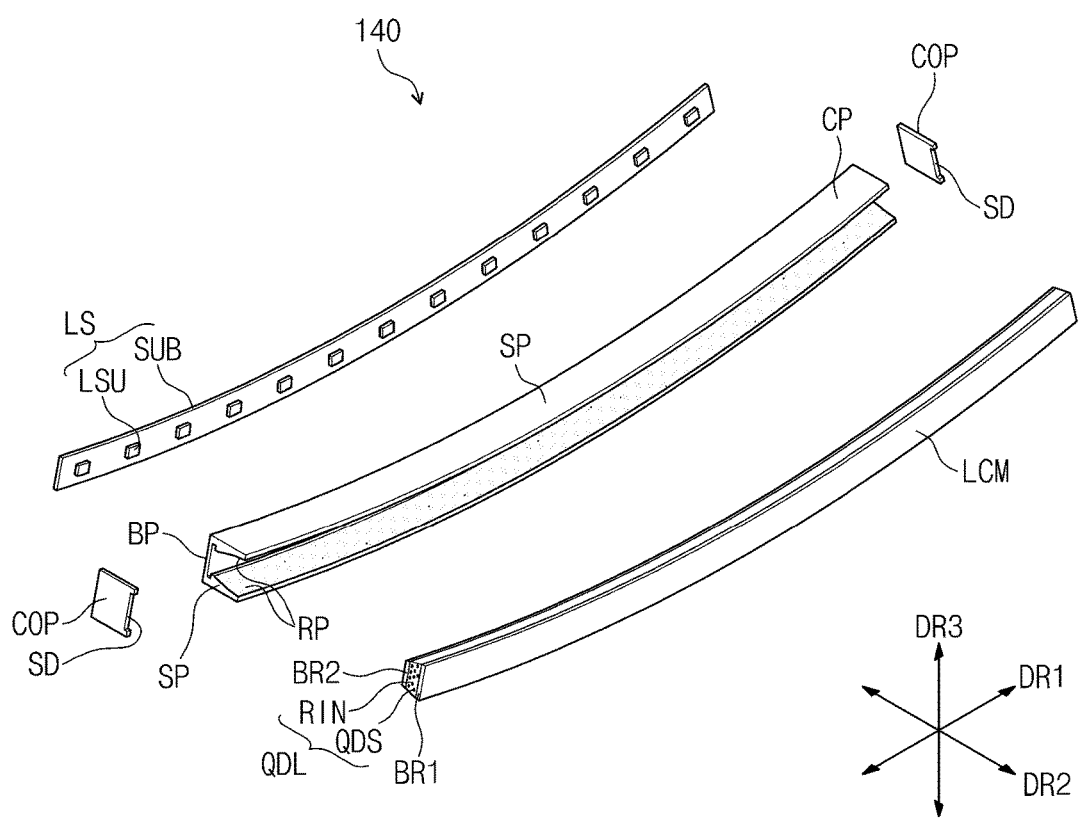
FIG. 3 is an exploded perspective view of a light generating member illustrated in FIG. 1.
Figure 4:
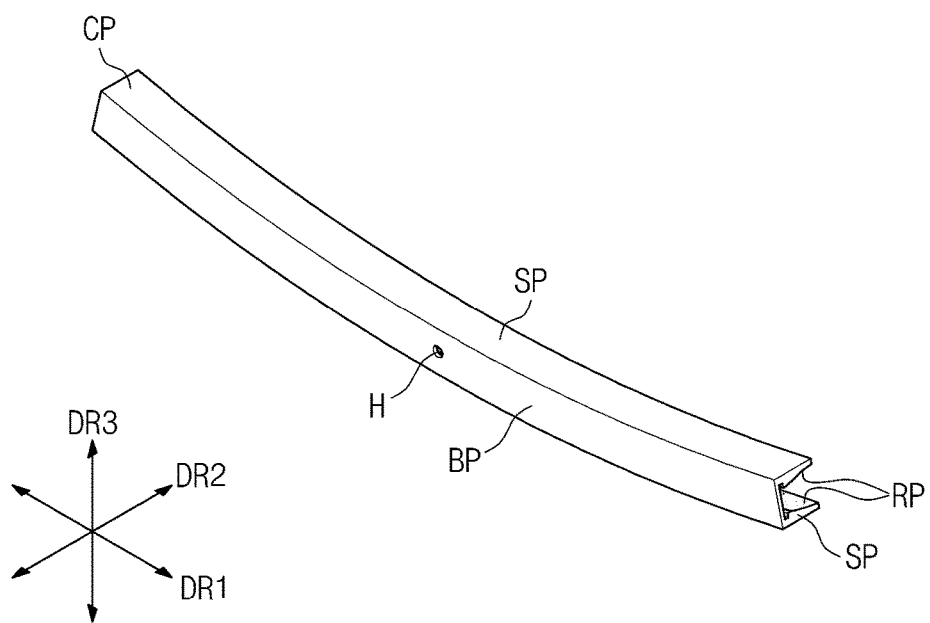
FIG. 4 is a rear surface of a case part illustrated in FIG. 3.

FIG. 3 is an exploded perspective view of the light generating member illustrated in FIG. 1. FIG. 4 is a rear surface of a case part illustrated in FIG. 3.

Referring to FIGS. 3 and 4, the light generating member 140 includes a light source LS which generates the first light, a light conversion member LCM which converts the first light into the second light, a case part CP accommodating the light source LS and the light conversion member LCM, and cover parts COP which cover both sides of the case part CP.

The light source LS includes a light source substrate SUB, which is curved with the predetermined curvature and extends along the first direction DR1, and a plurality of light source units LSU disposed (e.g., mounted) on the light source substrate SUB. The light source substrate SUB may have long sides, which are curved with the predetermined curvature and extends along the first direction DR1 to face each other, and short sides which are connected to ends of the long sides and extend in the third direction DR3 crossing the first and second directions DR1 and DR2 to face each other. The third direction DR3 may be bidirectional.

The light source units LSU may be arranged in a direction having the predetermined curvature along the first direction DR1 and may be disposed at a regular interval. The light source units LSU may be disposed on the light source substrate SUB to face the light entrance part of the light guide plate 130 (refer to FIG. 1) in the second direction DR2 and may generate the first light having a predetermined color. In an exemplary embodiment, the light source units LSU may be blue LEDs which generate blue light, for example.

In an exemplary embodiment, the case part CP may include a plastic material such as polycarbonate ("PC") and polymethyl methacrylate ("PMMA"). The case part CP is curved with the predetermined curvature and extends along the first direction DR1.

The case part CP includes a bottom portion BP, which has long sides facing each other and short sides connected to ends of the long sides to face each other, and sidewall portions SP connected to the long sides of the bottom portion to extend in a direction crossing a plane of the bottom portion BP. The long sides of the bottom portion BP have the predetermined curvature.

Specifically, the long sides of the bottom portion BP are curved with the predetermined curvature and extend along the first direction DR1, and the short sides of the bottom portion BP extend in the third direction DR3. The long sides of the bottom portion BP face each other in the third direction DR3, and the short sides of the bottom portion BP are disposed to face each other in the first direction DR1.

The sidewall portions SP are connected to the long sides of the bottom portion BP to extend in the second direction DR2 crossing the plane of the bottom portion BP and are disposed to face each other. The sidewall portions SP extend toward the light entrance part of the light guide plate 130 in the second direction DR2. Like the long sides of the bottom portion BP, the sidewall portions SP are curved with the predetermined curvature and extend along the first direction DR1. The bottom portion BP and the sidewall portions SP may constitute the case part CP by being provided in one piece. That is, bottom portion BP and the sidewall portions SP may be unitary with each other.

The light source LS and the light conversion member LCM are disposed in the second direction DR2 in a space between the bottom portion BP and the sidewall portions SP. The light conversion member LCM may be disposed adjacent to the light guide plate 130 in the second direction DR2. A configuration, in which the light source LS and the light conversion member LCM are disposed in the case part CP, will be described in detail with reference to FIG. 5 below.

The case part CP further includes reflective parts RP disposed in a predetermined area of inner surfaces of the sidewall portions SP which face each other in the third direction DR3. In an exemplary embodiment, the reflective part RP may include a material that reflects light, for example, aluminum (Al) and silver (Ag).

As illustrated in FIG. 4, a hole H which is defined at the center portion of the bottom portion BP of the case part CP to penetrate through the bottom portion BP in the second direction DR2. Function of the hole H will be described in detail in a method of manufacturing the light generating member 140 below.

The cover parts COP close an inner space of the case part CP in the first direction DR1 by being disposed to cover the both sides of the case part CP in the first direction DR1. The cover parts COP are disposed to cover both sides of the sidewall portions SP and the short sides of the bottom portion BP in the first direction DR1. As a result, the space between the bottom portion BP and the sidewall portions SP may be closed by the cover parts COP in the first direction DR1.

The cover parts COP have a plane parallel to the second direction DR2 and the third direction DR3. Each of the cover parts COP includes a step difference portion SD which is recessed by a predetermined depth toward a rear surface of the cover parts COP, an opposite surface of a front surface of the cover parts COP, in a predetermined area of the front surface of the cover parts COP facing the light guide plate 130.

Predetermined areas of both sides of the front surface of the cover parts COP are disposed to have the step difference portion SD disposed therebetween in the third direction DR3. The front surface of the cover parts COP having the step difference portion SD disposed therebetween may have a predetermined step difference from the step difference portions SD.

Except for the step difference portion SD, a distance between the front surface and the rear surface of the cover parts COP may be the same as a distance between one side of the sidewall portions SP facing the light guide plate 130 and a rear surface of the bottom portion BP opposite to the light guide plate 130 in the second direction DR2. A width of the cover parts COP in the third direction DR3 may be the same as a distance between outer surfaces of the sidewall portions SP, which are opposite surfaces of the inner surfaces of the sidewall portions SP facing each other in the third direction DR3.

The cover parts COP may include the same material as that of the case part CP. The cover parts COP may be connected to the both sides of the case part CP by various methods. In an exemplary embodiment, the cover parts COP may be bonded to the both sides of the case part CP by an adhesive member or may be connected to the both sides of the case part CP by a coupling pin, for example.

The light conversion member LCM may be curved with the predetermined curvature and extends along the first direction DR1. The light conversion member LCM includes a first barrier layer BR1, a second barrier layer BR2 disposed to face the first barrier layer BR1 in the second direction DR2, and a quantum dot layer QDL disposed between the first barrier layer BR1 and the second barrier layer BR2.

The first and second barrier layers BR1 and BR2 may be provided by curing a thermosetting resin or a photocurable resin. In an exemplary embodiment, the first and second barrier layers BR1 and BR2 may include polyethyleneterephthalate ("PET"), for example.

A length of the first barrier layer BR1 and a length of the second barrier layer BR2 in the first direction DR1 may be the same. In the third direction DR3, a width of the first barrier layer BR1 may be greater than a width of the second barrier layer BR2.

The quantum dot layer QDL includes a resin RIN and a plurality of quantum dots QDS included in the resin RIN. The quantum dot layer QDL converts the first light, which is provided from the light source units LSU, into the second light. In an exemplary embodiment, the quantum dot layer QDL may convert blue light, which is generated from the light source units LSU, into white light, for example.

The quantum dots QDS may include quantum dots having different sizes according to the type of the light source units LSU in order to generate white light. In an exemplary embodiment, in a case in which the light source units LSU generate blue light, the quantum dots QDS may include quantum dots QDS having a size which enables emitting light in a green wavelength range by adsorbing the light in a blue wavelength range and quantum dots QDS having a size which enables emitting light in a red wavelength range by adsorbing the light in a blue wavelength range, for example.

The quantum dots QDS of the quantum dot layer QDL absorb the blue light provided from the light source LS to convert the blue light into the light in a green or red wavelength range. A portion of the blue light may not be absorbed by the quantum dots QDS. Thus, white light may be generated while lights in blue, green, and red wavelength ranges are mixed one another in the quantum dot layer QDL.

Figure 5:
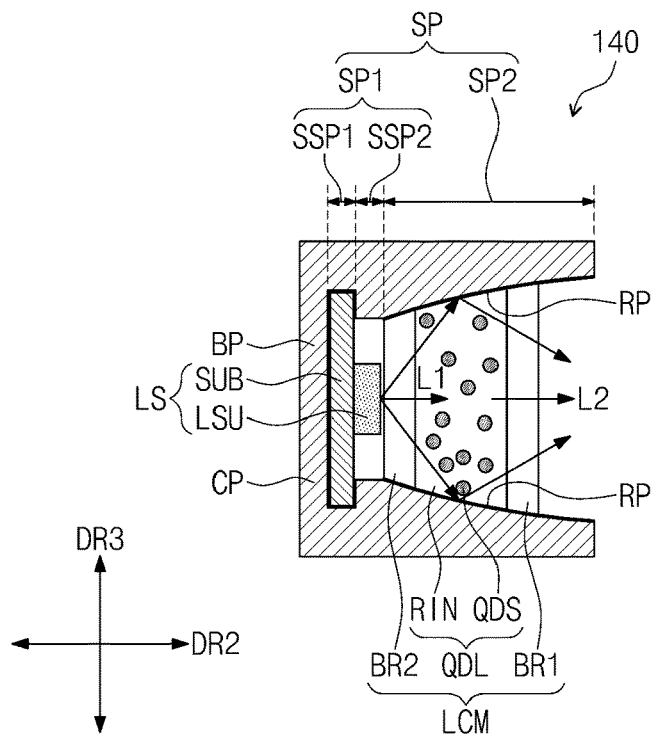
FIG. 5 is a cross-sectional view taken along line I-I' illustrated in FIG. 1.
Figure 6:
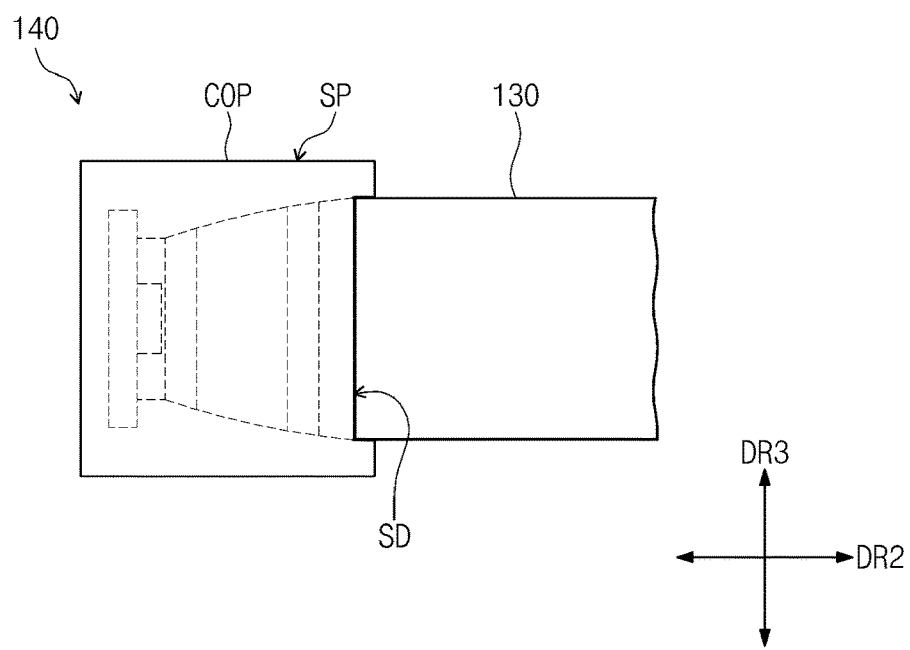
FIG. 6 is a side view of the light generating member in which a light conversion member illustrated in FIG. 1 is viewed in a first direction.

FIG. 5 is a cross-sectional view taken along line I-I' illustrated in FIG. 1. FIG. 6 is a side view of the light generating member in which the light conversion member illustrated in FIG. 1 is viewed in the first direction.

In FIG. 6, the light source LS and the light convert member LCM are illustrated in dotted line for convenience of explanation.

Referring to FIG. 5, the sidewall portions SP (e.g., an upper sidewall portion and a lower sidewall portion) include first sidewall portions SP1 (e.g., an upper first sidewall portion and a lower first sidewall portion), which are connected to the long sides of the bottom portion BP to extend in the second direction DR2, and second sidewall portions SP2 (e.g., an upper second sidewall portion and a lower second sidewall portion) which are connected to the first sidewall portions SP1 to extend in the second direction DR2. The first sidewall portions SP1 are disposed to face each other in the third direction DR3. The second sidewall portions SP2 are disposed to face each other in the third direction DR3.

The light source LS is disposed between the bottom portion BP and the first sidewall portions SP1. The light source LS, in a state in which the cover parts COP are not disposed on the case part CP, is disposed between the bottom portion BP and the first sidewall portions SP1 by being inserted into a space between the bottom portion BP and the first sidewall portions SP1 in the first direction DR1. The light convert member LCM is disposed between the second sidewall portions SP2.

The first sidewall portions SP1 include first sub-sidewall portions SSP1, which are connected to the long sides of the bottom portion BP to extend in the second direction DR2, and second sub-sidewall portions SSP2 (e.g., an upper second sub-sidewall portion and a lower second sub-sidewall portion) which are connected to the first sub-sidewall portions SSP1 to extend in the second direction DR2. One sides of the second sub-sidewall portions SSP2 are connected to the first sub-sidewall portions SSP1 and opposite sides of the second sub-sidewall portions SSP2 are connected to the second sidewall portions SP2 by being disposed between the first sub-sidewall portions SSP1 and the second sidewall portions SP2.

Hereinafter, surfaces of the first sub-sidewall portions SSP1, which face each other in the third direction DR3, are defined as inner surfaces of the first sub-sidewall portions SSP1, and an opposite surface of the inner surface of each first sub-sidewall portion SSP1 is defined as an outer surface of the first sub-sidewall portion SSP1. Surfaces of the second sub-sidewall portions SSP2, which face each other in the third direction DR3, are defined as inner surfaces of the second sub-sidewall portions SSP2, and an opposite surface of the inner surface of each second sub-sidewall portion SSP2 is defined as an outer surface of the second sub-sidewall portion SSP2. Surfaces of the second sidewall portions SP2, which face each other in the third direction DR3, are defined as inner surfaces of the second sidewall portions SP2, and an opposite surface of the inner surface of each second sidewall portion SP2 is defined as an outer surface of the second sidewall portion SP2.

A distance between the inner surfaces of the first sub-sidewall portions SSP1 is greater than a distance between the inner surfaces of the second sub-sidewall portions SSP2. The inner surfaces of the first sub-sidewall portions SSP1 and the inner surfaces of the second sub-sidewall portions SSP2 are disposed parallel to the second direction DR2. The light source substrate SUB is disposed between the first sub-sidewall portions SSP1, and the light source units LSU are disposed between the second sub-sidewall portions SSP2.

A distance between the inner surfaces of the second sidewall portions SP2 increases as farther from the first sidewall portions SP1. The inner surfaces of the second sidewall portions SP2 extend to have a recessed curved shape along the second direction DR2 and are disposed to be symmetrical to each other. The reflective parts RP are respectively disposed on the inner surfaces of the second sidewall portions SP2. The light convert member LCM may be disposed to contact the reflective parts RP between the inner surfaces of the second sidewall portions SP2.

A width of the light conversion member LCM in the second direction DR2 may be less than a width of the second sidewall portions SP2. The first barrier layer BR1 of the light conversion member LCM is disposed to face the light entrance part of the light guide plate 130, and the second barrier layer BR2 is disposed adjacent to the light source units LSU of the light source LS.

A rear surface of the light conversion member LCM, which does not face the light guide plate 130 in the second direction DR2, may be disposed to overlap a boundary between the first side wall portion SP1 and the second side wall portion SP2. In an exemplary embodiment, a rear surface of the second barrier layer BR2, which does not face the first barrier layer BR1 in the second direction DR2, may be disposed to overlap the boundary between the first side wall portions SP1 and the second side wall portions SP2, for example.

In an exemplary embodiment, a width of the second sub-sidewall portions SSP2 in the second direction DR2 may be greater than a width of the light source units LSU. Thus, the light source units LSU may be disposed so as not to contact the second barrier layer BR2 of the light conversion member LCM. However, the invention is not limited thereto, and the width of the second sub-sidewall portions SSP2 in the second direction DR2 may be the same as the width of the light source units LSU so that the light source units LSU may be disposed to contact the second barrier layer BR2 of the light conversion member LCM.

First light L1 generated in the light source units LSU is provided to the light conversion member LCM and may be converted into second light L2 in the light conversion member LCM to be emitted toward the light entrance part of the light guide plate 130. First light emitted toward the inner surfaces of the second side wall portions SP2 among the first light L1 generated in the light source units LSU is reflected at the reflective parts RP disposed on the inner surfaces of the second side wall portions SP2 and may be emitted by being converted into the second light L2 in the light conversion member LCM. Thus, luminous efficiency may be improved.

As illustrated in FIG. 6, the front surface of the cover parts COP having the step difference portion SD disposed therebetween may have a predetermined step difference from the step difference portions SD, and may be disposed to overlap one side of the sidewall portions SP which is an opposite side of the other side of the sidewall portions SP connected to the bottom portion BP. Specifically, the front surface of the cover parts COP having the step difference portion SD disposed therebetween may be disposed to overlap one side of the second sidewall portions SP2 which is an opposite side of the other side of the second sidewall portions SP2 connected to the first side wall portions SP1.

The first barrier layer BR1 of the light conversion member LCM is disposed lower than the step difference portions SD of the cover parts COP in a direction toward a bottom surface of the bottom portion BP which is defined as an opposite surface of the inner surface of the bottom portion BP on which the light source substrate SUB of the light source LS is disposed. A light entrance surface of the light guide plate 130 may be disposed to face the light generating member 140 and the step difference portions SD of the cover parts COP.

Predetermined areas of both sides of the light entrance part of the light guide plate 130 in the first direction DR1 may be disposed to contact the step difference portions SD of the cover parts COP. As a result, the light entrance part of the light guide plate 130 may not contact the light conversion member LCM.

The light guide plate 130 may be expanded by heat which is generated in the display apparatus 100 during the operation of the display apparatus 100. In a case in which the expanded light guide plate 130 contacts the light conversion member LCM to apply a pressure to the light conversion member LCM, the light conversion member LCM may be damaged.

However, in an exemplary embodiment of the invention, since the expanded light guide plate 130 contacts the step difference portions SD, the expansion of the light guide plate 130 may be blocked. Thus, since the light guide plate 130 does not contact the light conversion member LCM, the damage of the light conversion member LCM due to the expansion of the light guide plate 130 may be prevented.

Different from the exemplary embodiment, the light conversion member LCM may be prepared in the form of a disc having a rectangular shape or in the form of a tube which extends in any one direction. The light conversion member in the form of a disc may be provided in plurality and may be disposed to correspond to the light source units.

During the preparation of the light conversion member in the form of a disc, a predetermined groove is defined in a lower substrate and quantum dots are filled in the groove of the lower substrate. Thereafter, a frit is disposed on a top surface of the lower substrate excluding the groove to surround the groove, and the lower substrate and an upper substrate are bonded with the frit to seal the quantum dots. The quantum dots are only filled in the groove of the lower substrate and the quantum dots are not filled in a space in which the frit is disposed. Blue light generated in the light source may not be converted into white light in an area on which the frit is disposed and may be transmitted as it is. In this case, a color stain phenomenon may occur in which some of the blue light is displayed on the display panel.

The light generating member 140 according to an exemplary embodiment of the invention includes the light conversion member LCM which has the predetermined curvature and converts the first light L1 into the second light L2 without an area that is not filled with the quantum dots QDS. Thus, display quality may be improved by preventing color stains.

FIGS. 7 through 10 illustrate various exemplary embodiments of the light conversion member of the display apparatus according to the exemplary embodiment of the invention.

Referring to FIGS. 7 through 10, the light conversion member LCM includes a groove G recessed from a bottom surface of the light conversion member LCM facing the light source LS to a top surface of the light conversion member LCM which is an opposite surface of the bottom surface of the light conversion member LCM. Specifically, the groove G is defined by being recessed by a predetermined depth from a bottom surface of the second barrier layer BR2 to a top surface of the second barrier layer BR2 which is an opposite surface of the bottom surface of the second barrier layer BR2.

Figure 7:
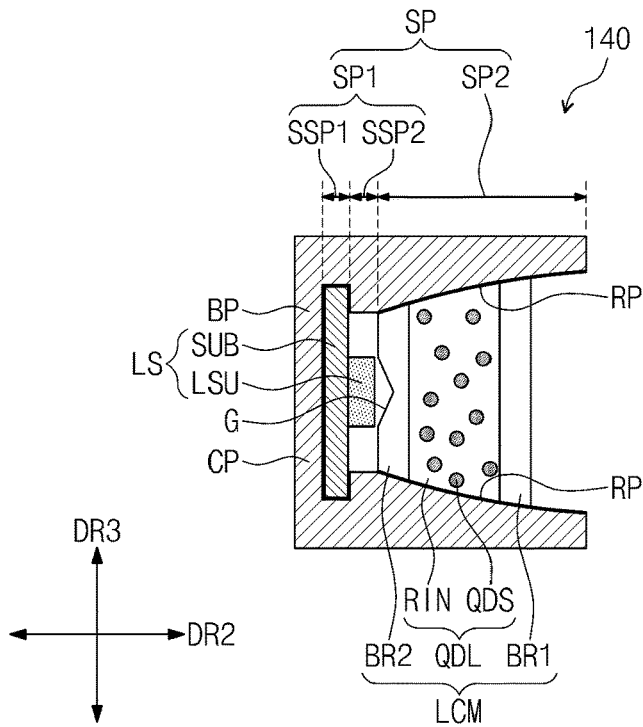
FIGS. 7 through 10 illustrate various exemplary embodiments of the light conversion member of the display apparatus according to the exemplary embodiment of the invention.
Figure 9:
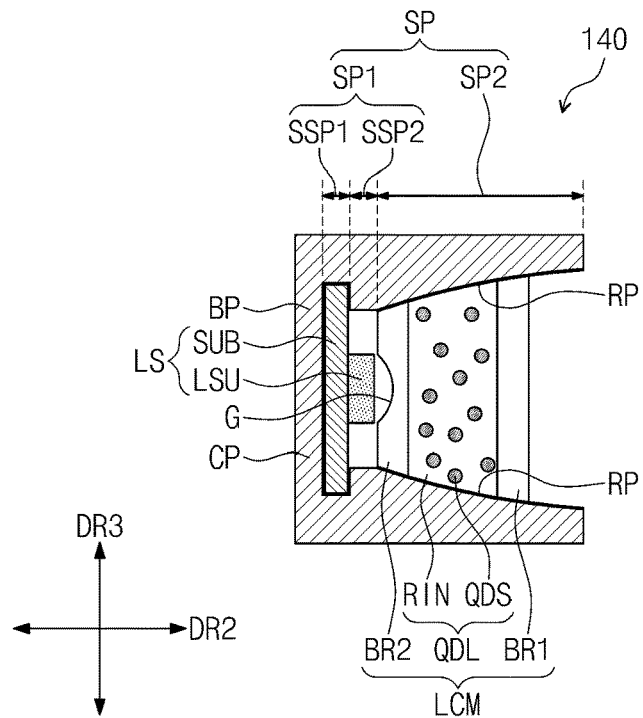
Figure 10:
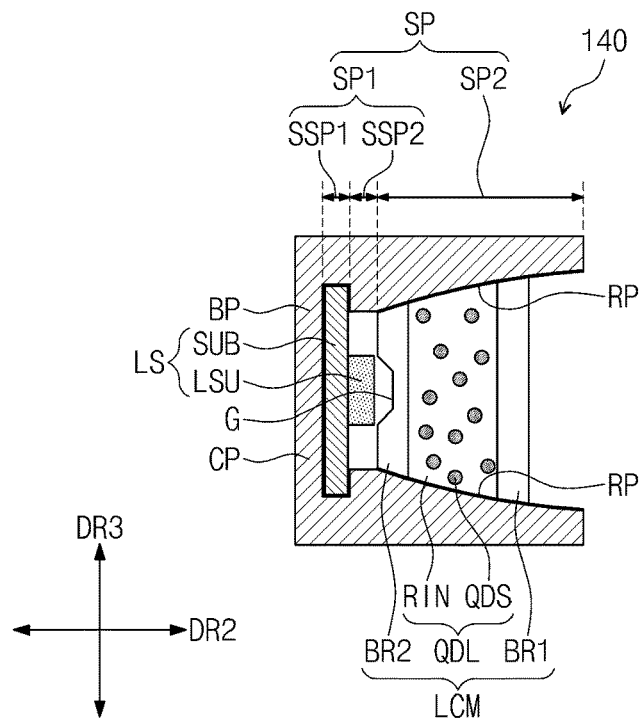

As illustrated in FIGS. 7, 9, and 10, the groove G may have a V-valley shape, a concave shape, or an inverted trapezoidal shape, for example. Although the V-valley shape, the concave shape, or the inverted trapezoidal shape is exemplarily illustrated, the invention is not limited thereto and the groove G may have various shapes.

Figure 8:
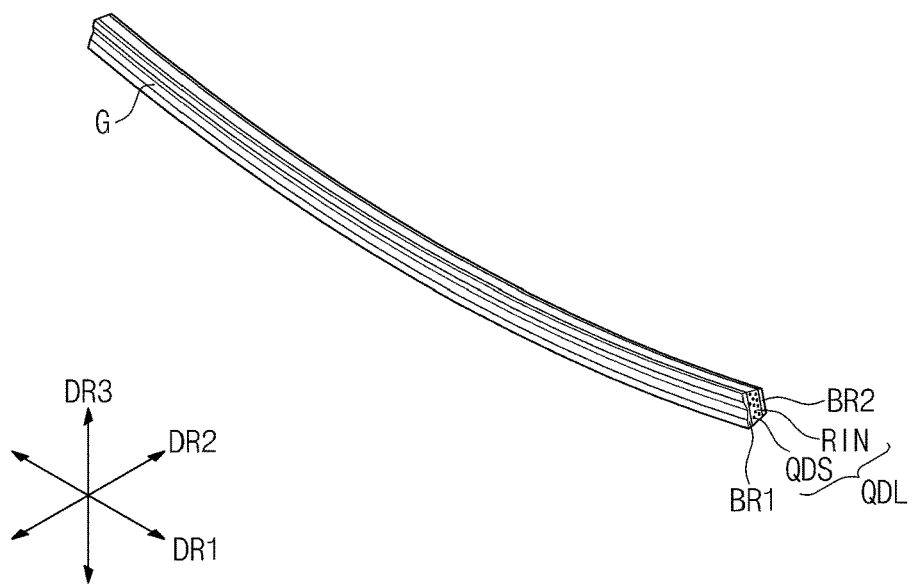

As illustrate in FIG. 8, the groove G having the V-valley shape may be curved with the predetermined curvature and extends along the first direction DR1. The groove G may be disposed to overlap the light source units LSU when viewed from the second direction DR2. Although not shown in the drawings, the groove having the concave shape or the inverted trapezoidal shape may be curved with the predetermined curvature and extends along the first direction DR1, and may be disposed to overlap the light source units LSU.

The groove G of the light conversion member LCM may change the first light emitted from the light source units LSU to a larger angle from an optical axis. Since the groove G may disperse the first light by changing a path of the first light emitted from the light source units LSU, the first light may not be concentrated in any one area and may be dispersed by the groove G. As a result, brightness uniformity of the first light is improved by the groove G, and brightness uniformity of the second light may also be improved.

Figure 11:
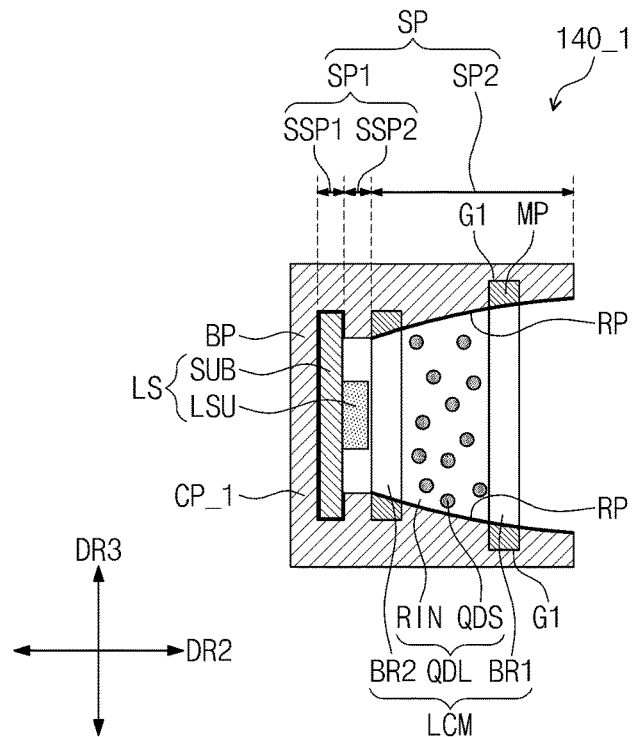
FIG. 11 is a cross-sectional view illustrating a light generating member of a display apparatus according to another exemplary embodiment of the invention.
Figure 12:
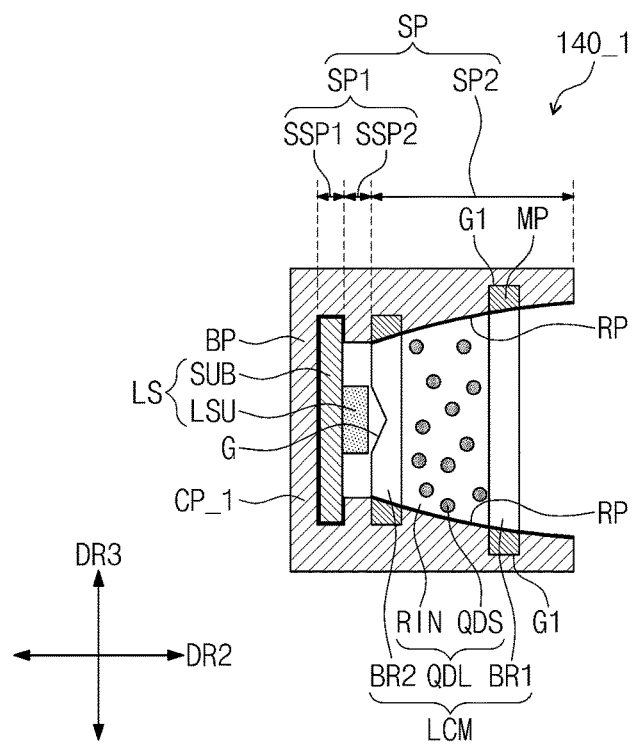
FIGS. 12 through 14 illustrate various exemplary embodiments of a light conversion member of the display apparatus according to the another exemplary embodiment of the invention.
Figure 13:
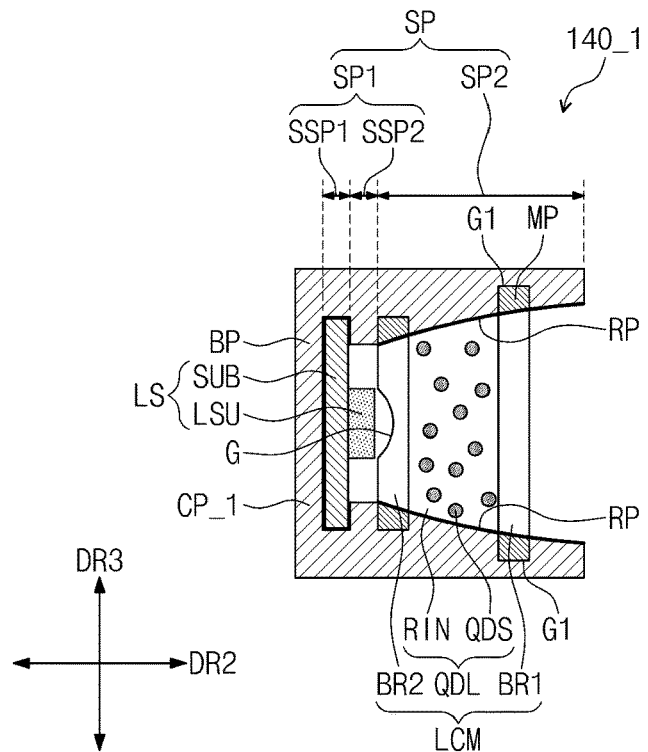
Figure 14:
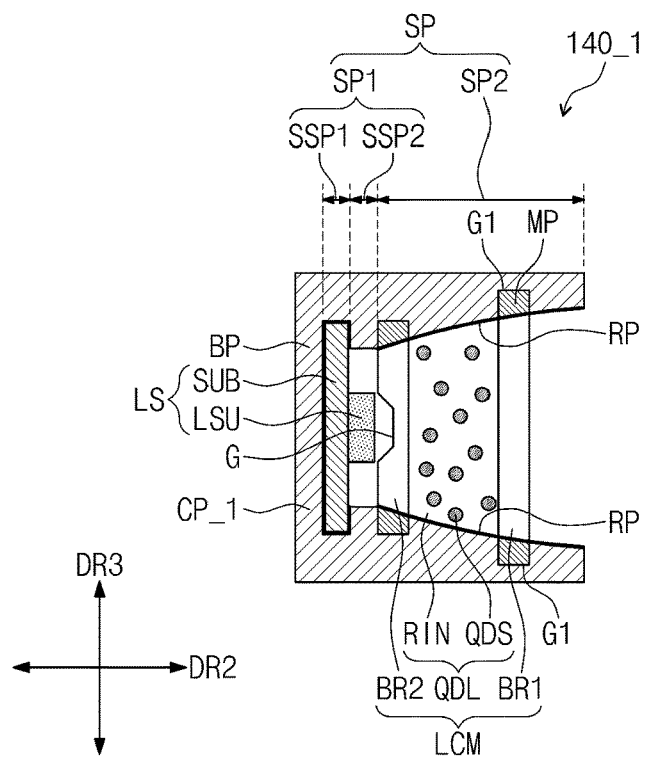

FIG. 11 is a cross-sectional view illustrating a light generating member of a display apparatus according to another exemplary embodiment of the invention. FIGS. 12 through 14 illustrate various exemplary embodiments of a light conversion member of the display apparatus according to the another exemplary embodiment of the invention.

The display apparatus according to the another exemplary embodiment of the invention illustrated in FIG. 11 has the same configuration as the display apparatus 100 illustrated in FIG. 1 except that a configuration of a case part CP_1 of a light generating member 140_1 is different. Thus, hereinafter, the configuration different from the display apparatus 100 illustrated in FIG. 1 is described and the same configuration is illustrated using the same reference numerals.

Referring to FIG. 11, a plurality of first grooves G1, which are recessed by a predetermined depth from inner surfaces of second sidewall portions SP2 overlapping first and second barrier layers BR1 and BR2 to outer surfaces of the second sidewall portions SP2, is defined in the case part CP_1 and a plurality of metal parts MP is disposed in the first grooves G1.

The metal parts MP may be disposed to overlap the first and second barrier layers BR1 and BR2. Reflective parts RP are disposed on the inner surfaces of the second sidewall portions SP2 in areas excluding the first grooves G1 in which the metal parts MP are disposed.

Except for the above-described configuration, the configuration of the light generating member 140_1 is the same as the configuration of the light generating member 140 illustrated in FIG. 5. The reason for the metal parts MP to be disposed in the first grooves G1 will be described in detail in a method of manufacturing a light generating member below.

Referring to FIGS. 12 to 14, a groove G which is defined in a bottom surface of the second barrier layer BR2 of the light convert member LCM. A shape of the groove G is substantially the same as that of the groove G illustrated in FIGS. 7, 9 and 10. That is, the groove G may be curved with the predetermined curvature and extends along the first direction DR1, and may have the V-valley shape, the concave shape, or the inverted trapezoidal shape.

FIGS. 15 through 21 illustrate a method of manufacturing a light generating member according to an exemplary embodiment of the invention.

For convenience of explanation, a cross-section of a case part CP having a region, in which a hole H of the case part CP is defined, is illustrated in FIGS. 15 to 19.

Figure 15:
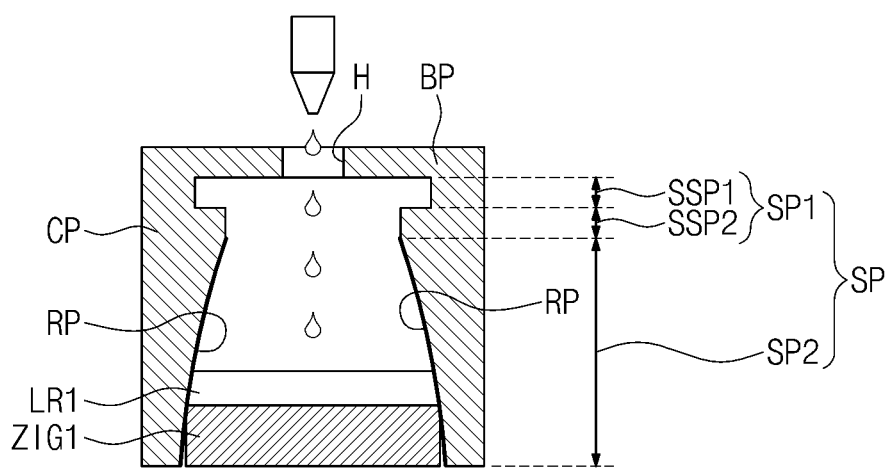
FIGS. 15 through 21 illustrate a method of manufacturing a light generating member according to an exemplary embodiment of the invention.

Referring to FIG. 15, the case part CP is disposed to allow a front surface of the case part CP to face a lower direction and to allow a rear surface of the case part CP, an opposite surface of the front surface of the case part CP, to face an upper direction. The front surface of the case part CP corresponds to the other surface of the side wall portions SP and the rear surface of the case part CP corresponds to a rear surface of a bottom portion BP.

A first zig ZIG1 is disposed between second sidewall portions SP2 adjacent to one side of the second sidewall portions SP2 which is an opposite side of the other side of the second sidewall portions SP2 connected to first sidewall portions SP1. A width of the first zig ZIG1 is less than a width of the second sidewall portions SP2 based on a vertical direction in FIG. 15. The first zig ZIG1 may be disposed to contact the second sidewall portions SP2. In FIG. 15, the vertical direction corresponds to the second direction DR2.

In an exemplary embodiment, the first zig ZIG1 may be disposed between the second sidewall portions SP2 so as to allow a bottom surface of the first zig ZIG1 to be parallel to the front surface of the case part CP, for example. Although not shown in the drawings, the first zig ZIG1 may be curved with a predetermined curvature corresponding to a curvature of the case part CP and may extend along the first direction DR1. The first zig ZIG1 may be disposed in a predetermined space adjacent to the front surface of the case part CP among spaces between the second sidewall portions SP2.

A liquid first resin LR1 is injected into the case part CP through the hole H. In an exemplary embodiment, the first resin LR1 may be a thermosetting resin, for example. The first resin LR1 is provided on the first zig ZIG1 via a space between the first sidewall portions SP1. The first resin LR1 is provided on the first zig ZIG1 to be stacked to a thickness corresponding to a thickness of a first barrier layer BR1.

Although not shown in the drawings, a process of vibrating the case part CP may be added so that the liquid first resin LR1 disposed on the first zig ZIG1 is more quickly disposed flat on the first zig ZIG1. The process may be defined as a planarization process.

Figure 16:
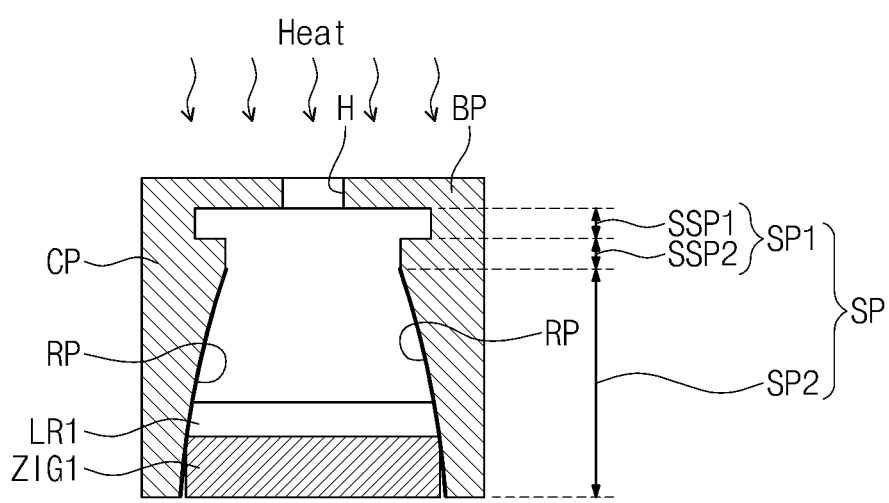

Referring to FIG. 16, heat may be generated and transferred to the case part CP and the first resin LR1. The liquid first resin LR1 is cured by the heat and the first barrier layer BR1 may be provided by the cured first resin LR1. The first barrier layer BR1 is provided and the first zig ZIG1 is then removed.

Figure 17:
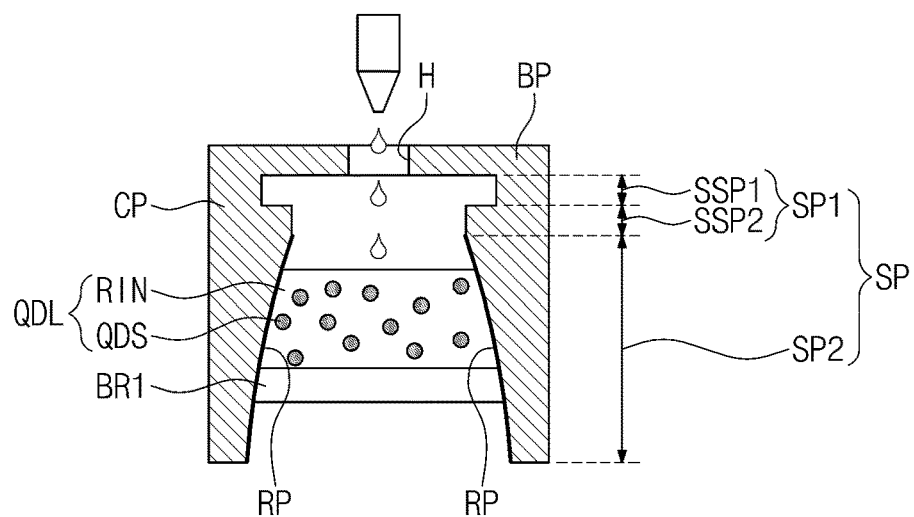

Referring to FIG. 17, a liquid resin RIN, in which quantum dots QDS are included, is injected into the case part CP through the hole H. The resin RIN is provided on the first barrier layer BR1 via the space between the first sidewall portions SP1. The resin RIN is provided on the first barrier layer BR1 to be stacked to a thickness corresponding to a thickness of a quantum dot layer QDL.

Although not shown in the drawings, a planarization process may be added in which the case part CP is vibrated so that the liquid resin RIN disposed on the first barrier layer BR1 is more quickly disposed flat on the first barrier layer BR1.

The resin RIN is disposed flat, and the resin RIN may then be cured to form the quantum dot layer QDL.

Figure 18:
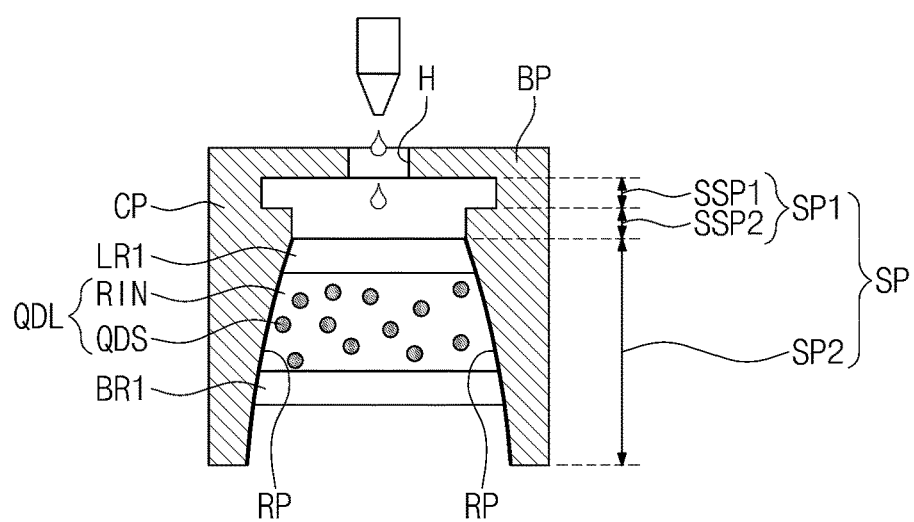

Referring to FIG. 18, the liquid first resin LR1 is injected again into the case part CP through the hole H. The first resin LR1 is provided on the quantum dot layer QDL via the space between the first sidewall portions SP1. The first resin LR1 is provided on the quantum dot layer QDL to be stacked to a thickness corresponding to a thickness of a second barrier layer BR2. The first resin LR1 may be filled to a boundary between the first sidewall portions SP1 and the second sidewall portions SP2.

Although not shown in the drawings, a planarization process may be added in which the case part CP is vibrated so that the liquid first resin LR1 disposed on the quantum dot layer QDL is more quickly disposed flat on the quantum dot layer QDL.

Figure 19:
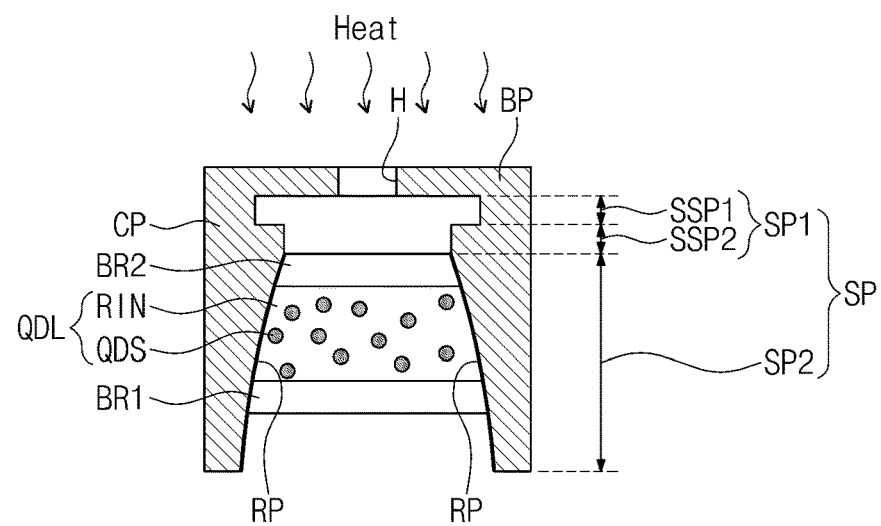

Referring to FIG. 19, the liquid first resin LR1 disposed on the quantum dot layer QDL may be cured by heat to form the second barrier layer BR2. A light conversion member LCM may be prepared and disposed between the second barrier layers BR2 of the case part CP by the above-described process.

Although not shown in the drawings, when the liquid first resin LR1 and the liquid resin RIN are provided in the case part CP through the hole H, additional zigs, which cover both sides of the case part CP in the first direction DR1, may be disposed at the both sides of the case part CP.

Figure 20:
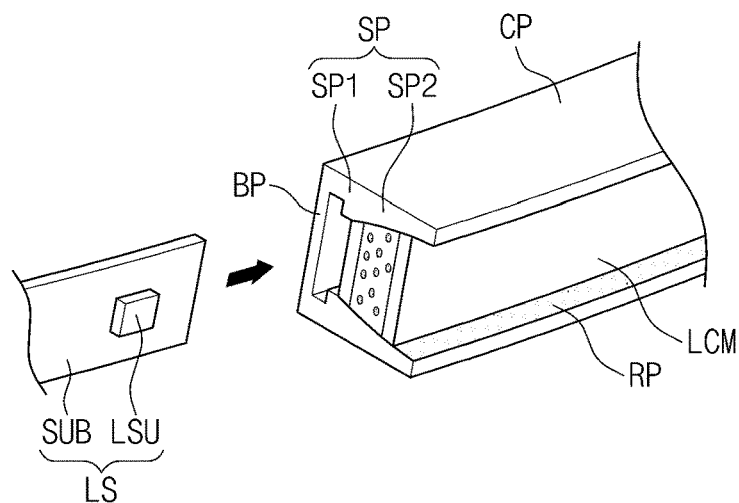

Referring to FIG. 20, since a light source LS is disposed between the bottom portion BP and the first side wall portions SP1 by being inserted into a space between the bottom portion BP and the first side wall portions SP1, light source units LSU may be disposed to face the light conversion member LCM.

Figure 21:
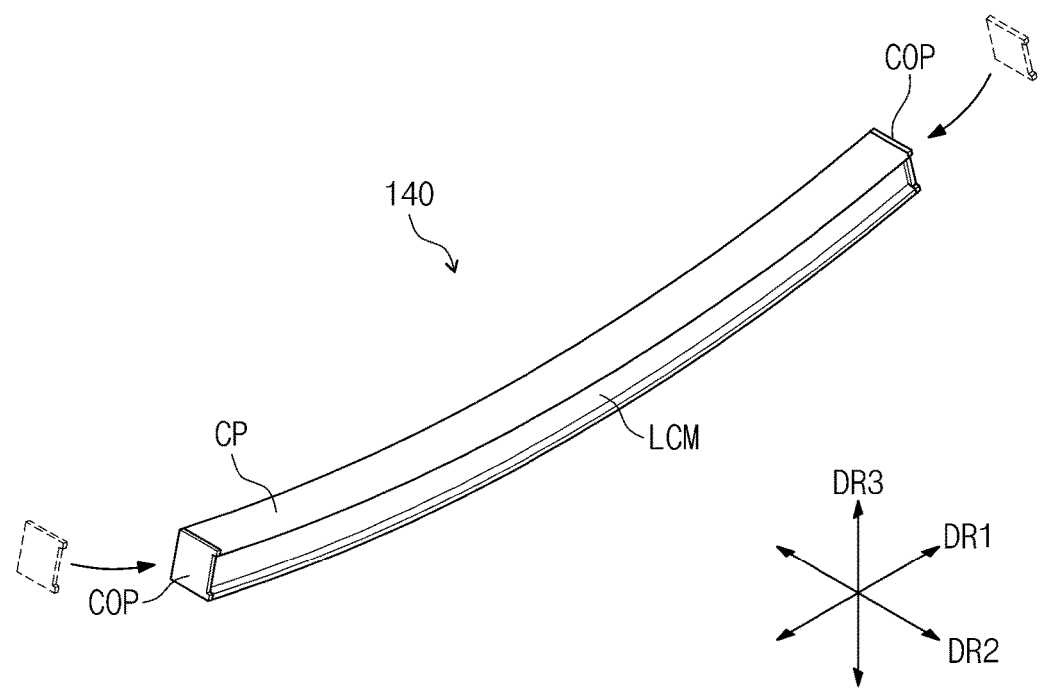

Referring to FIG. 21, cover parts COP are connected to the both sides of the case part CP in the first direction DR1. A space between the bottom portion BP and the side wall portions SP is closed by the cover parts COP in the first direction DR1, and a light generating member 140 may be finally manufactured.

Different from the illustrated exemplary embodiment, in a case in which the light conversion member LCM is prepared in the form of a tube extending in any one direction, the light conversion member in the form of a tube is prepared by filling quantum dots in an inner space of a quantum dot tube including glass. The light conversion member in the form of a tube has a linear shape. However, when the light conversion member in the form of a tube having a predetermined curvature is prepared by using glass, it is difficult to maintain the inner space filled with the quantum dots at a predetermined spacing, and the light conversion member, which includes glass and is in the form of a tube having the predetermined curvature, may be easily damaged. Also, as described above, in the case that the light conversion member is prepared in the disc shape, an area that is not filled with quantum dots is generated.

In an exemplary embodiment of the invention, since the first barrier layer BR1, the quantum dot layer QDL, and the second barrier layer BR2 are sequentially and easily provided between the second sidewall portions SP2 of the case part CP without using the glass tube in which the inner space is difficult to be maintained at a predetermined spacing, the area that is not filled with quantum dots is not generated.

The liquid resin RIN including the quantum dots QDS is planarized by the planarization process and is then cured to form the quantum dot layer QDL. Thus, the quantum dot layer QDL may be easily provided to a predetermined thickness, and the light conversion member LCM may not be easily damaged because glass is not used.

As a result, the method of manufacturing the light generating member 140 according to the exemplary embodiment of the invention may easily prepare the light conversion member LCM which has the predetermined curvature and converts light without the area that is not filled with quantum dots.

FIGS. 22 through 25 illustrate a method of manufacturing the groove of the light conversion member illustrated in FIGS. 7, 9, and 10.

Referring to FIGS. 22 to 25, after disposing the liquid first resin LR1 for forming the second barrier layer BR2 on the quantum dot layer QDL and before curing the liquid first resin LR1, a second zig ZIG2, which is curved with the predetermined curvature corresponding to the curvature of the case part CP and extends along the first direction DR1, is prepared.

The second zig ZIG2 includes a first sub-zig SZ1G1 disposed between the first sidewall portions SP1 and a second sub-zig SZ1G2 which is disposed on the first sub-zig SZ1G1 and protrudes from the first sub-zig SZ1G1. In an exemplary embodiment, the second sub-zig SZ1G2 may have a mountain shape, a convex shape, or a trapezoidal shape, for example.

Figure 23:
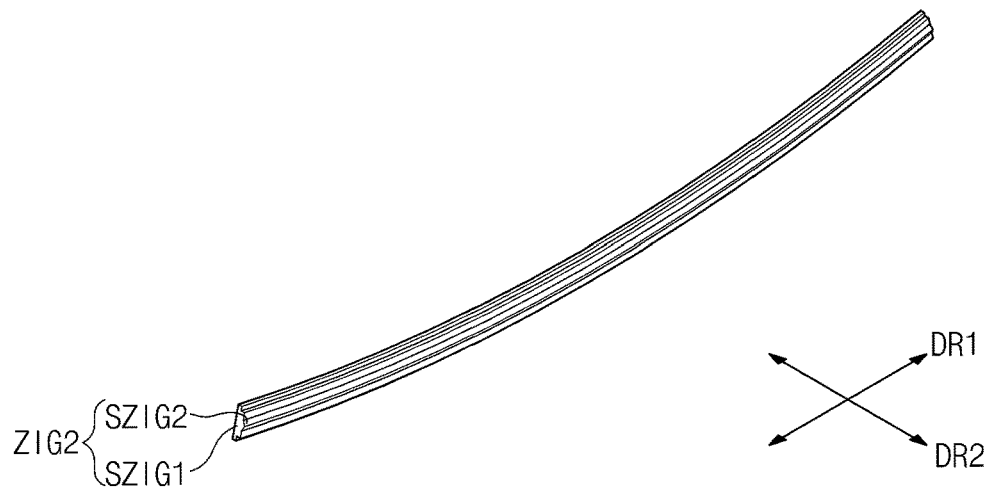

As illustrated in FIG. 23, the second sub-zig SZ having the mountain shape is curved with the predetermined curvature and extends along the first direction DR1. Although not shown in the drawings, the second sub-zig SZ having the convex shape, or the trapezoidal shape may also be curved with the predetermined curvature and extends along the first direction DR1.

The second zig ZIG2 is inserted into the space between the bottom portion BP and the side wall portions SP through one side of the case part CP in the first direction DR1. In a case in which the second zig ZIG2 is inserted through the one side of the case part CP, an additional zig may close the other side of the case part CP in the first direction DR1.

The first sub-zig SZ1G1 is disposed between the bottom portion BP and the first side wall portions SP1 by being inserted into the space between the bottom portion BP and the first side wall portions SP1. The second sub-zig SZ1G2 is inserted toward the first resin LR1 disposed on the quantum dot layer QDL. A thickness of the second sub-zig SZ1G2 is less than a thickness of the first resin LR1 disposed on the quantum dot layer QDL based on a vertical direction in FIG. 22. The second sub-zig SZ1G2 is disposed to overlap a region in which the light source units LSU are disposed.

Figure 22:
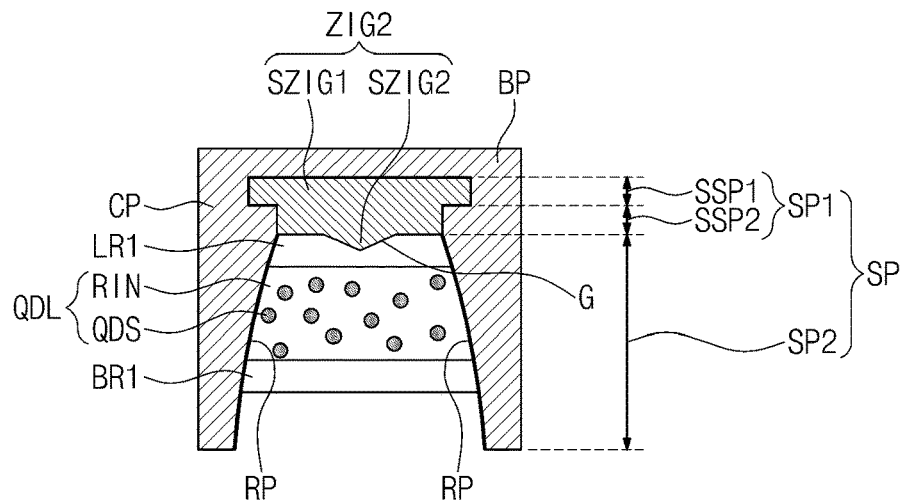
FIGS. 22 through 25 illustrate a method of manufacturing a groove of the light conversion member illustrated in FIGS. 7, 9, and 10.
Figure 24:
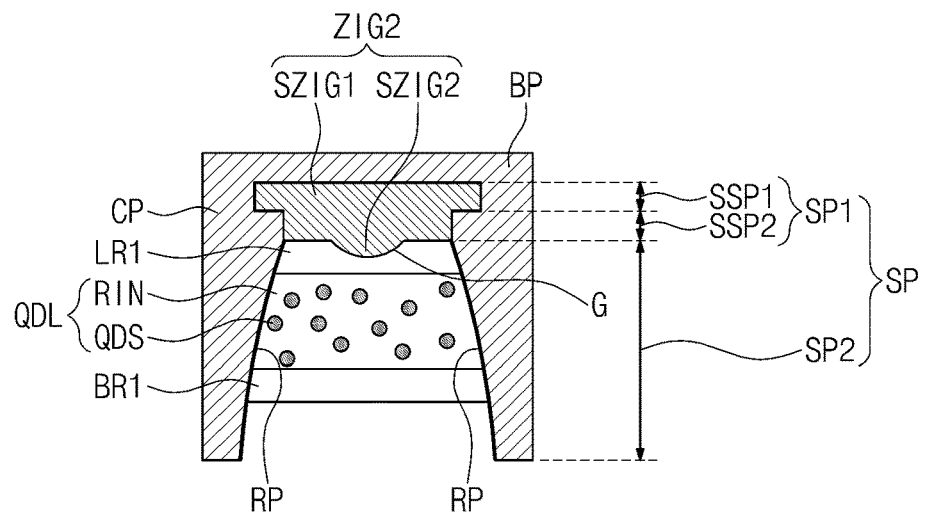
Figure 25:
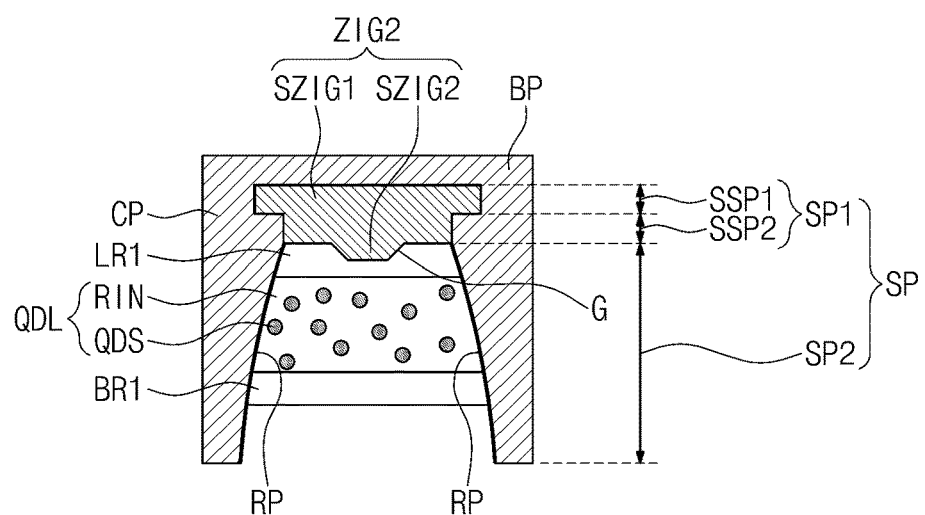

As illustrated in FIG. 22, a V-valley shaped groove G may be defined in the liquid first resin LR1 by the mountain shape of the second sub-zig SZ1G2. As illustrated in FIG. 24, a concave-shaped groove G may be defined in the liquid first resin LR1 by the convex shape of the second sub-zig SZ1G2. As illustrated in FIG. 25, an inverted trapezoidal-shaped groove G may be defined in the liquid first resin LR1 by the trapezoidal shape of the second sub-zig SZ1G2.

Thereafter, the first resin LR1 is cured by heat, and thus, the groove G having a V-valley shape, a concave shape, or a trapezoidal shape may be defined in the second barrier layer BR2, for example.

The light generating member 140 illustrated in FIGS. 7, 9, and 10 may be manufactured by adding a process of forming the groove G illustrated in FIGS. 22, 24, and 25 to the method of manufacturing the light generating member 140 described in FIGS. 15 to 21.

FIGS. 26 through 31 illustrate a method of manufacturing a light generating member according to another exemplary embodiment of the invention.

For convenience of explanation, a cross-section of an arbitrary area of the case part CP_1 is illustrated in FIGS. 26 to 31.

Figure 26:
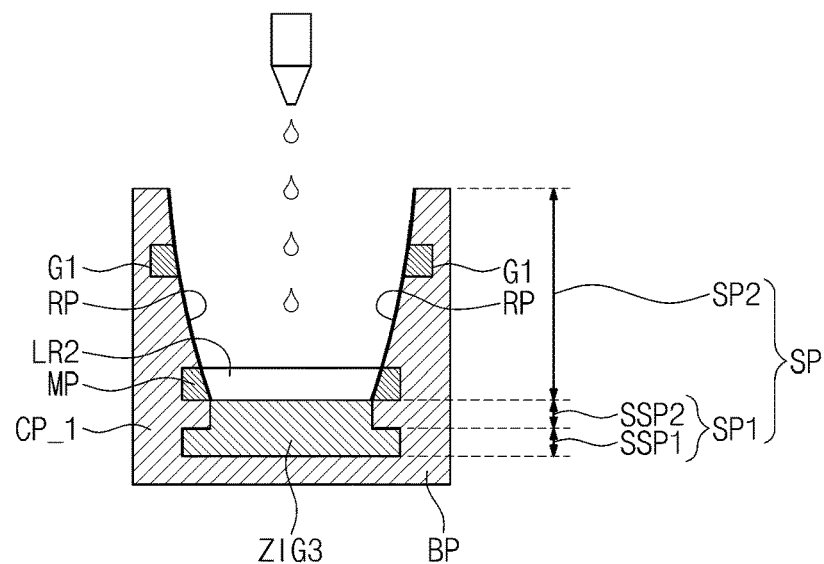
FIGS. 26 through 31 illustrate a method of manufacturing a light generating member according to another exemplary embodiment of the invention.

Referring to FIG. 26, the case part CP_1 is disposed to allow a front surface of the case part CP_1 to face an upper direction and to allow a rear surface of the case part CP_1 to face a lower direction. A third zig ZIG3 is disposed between the bottom portion BP and the first sidewall portions SP1 by being inserted into a space between the bottom portion BP and the first sidewall portions SP1. A top surface of the third zig ZIG3 may be disposed to overlap a boundary between the first sidewall portions SP1 and second sidewall portions SP2.

A liquid second resin LR2 is provided on the third zig ZIG3 through a space between the second sidewall portions SP2. The second resin LR2 may be a photocurable resin. The second resin LR2 may be provided on the third zig ZIG3 to be stacked to a thickness corresponding to a thickness of the second barrier layer BR2.

The second resin LR2 may be provided on the third zig ZIG3 to overlap the metal parts MP adjacent to the boundary between the first sidewall portions SP1 and the second sidewall portions SP2. The second resin LR2 is provided on the third zig ZIG3, and a planarization process may then be performed on the second resin LR2.

Figure 27:
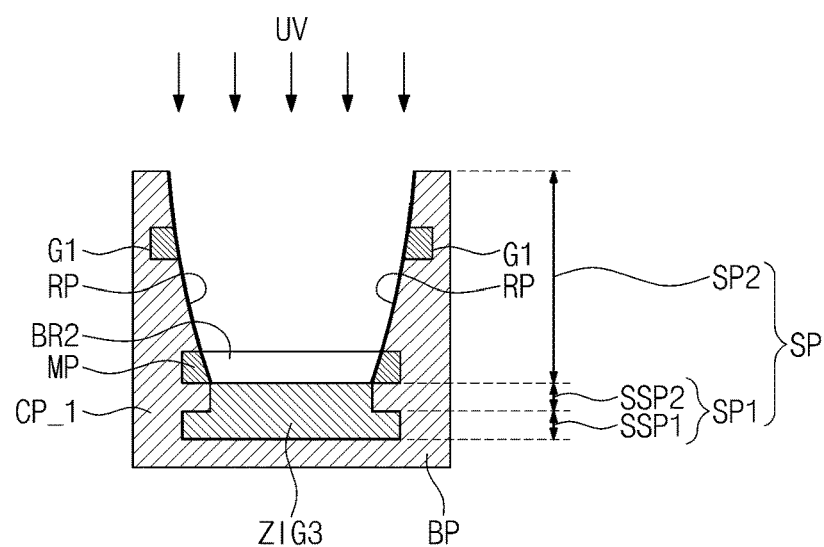

Referring to FIG. 27, a ultraviolet ("UV") light, for example, is provided to the liquid second resin LR2 through the space between the second sidewall portions SP2, and the second resin LR2 is cured by the UV light. The second barrier layer BR2 may be provided by the second resin LR2 which is cured by the UV light. The second barrier layer BR2 is provided and the third zig ZIG3 is then removed.

Figure 28:
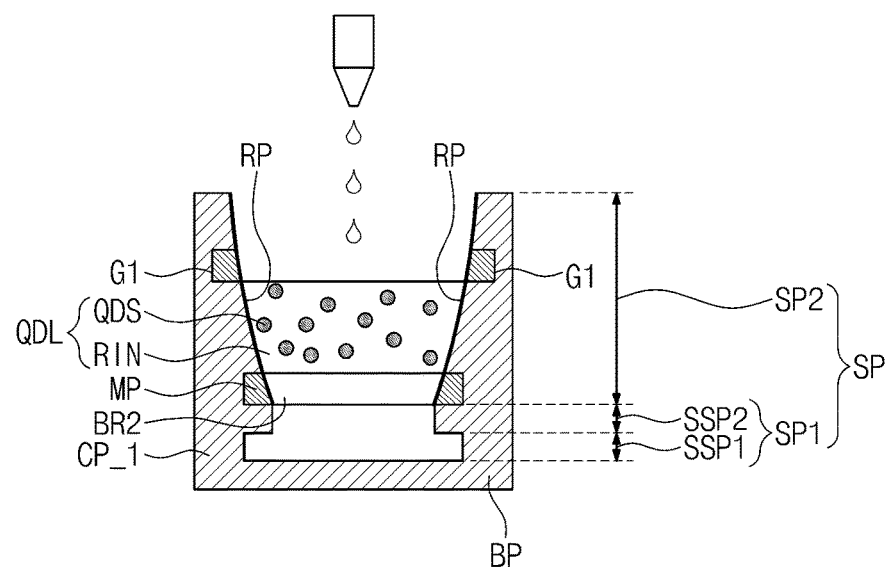

Referring to FIG. 28, a liquid resin RIN including the quantum dots QDS are provided on the second barrier layer BR2 to be stacked to a thickness corresponding to a thickness of the quantum dot layer QDL through the space between the second sidewall portions SP2. The liquid resin RIN is provided on the second barrier layer BR2, and a planarization process may then be performed. The resin RIN is cured to form the quantum dot layer QDL.

Figure 29:
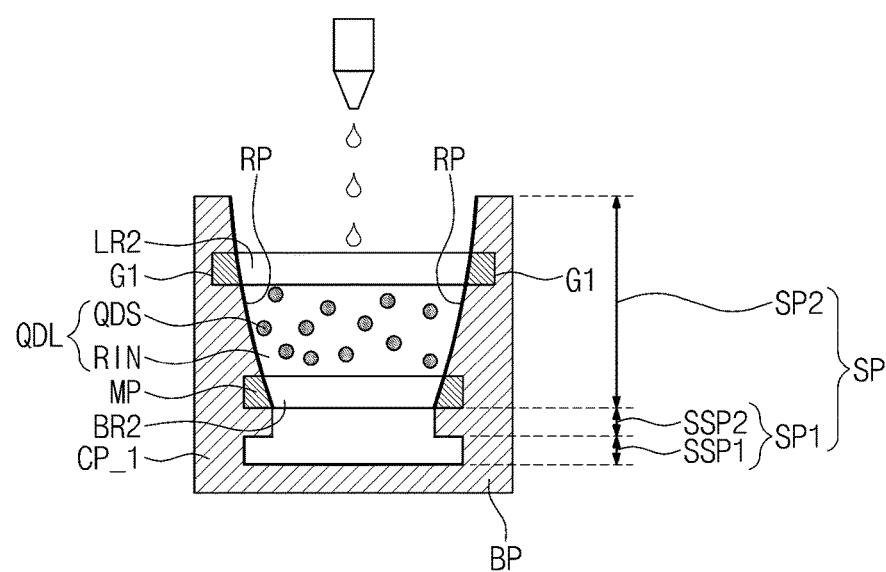

Referring to FIG. 29, the liquid second resin LR2 is provided again on the quantum dot layer QDL to be stacked to a thickness corresponding to a thickness of the first barrier layer BR1 through the space between the second sidewall portions SP2. The second resin LR2 may be provided on the quantum dot layer QDL to overlap the metal parts MP adjacent to the front surface of the case part CP_1. The liquid second resin LR2 is provided on the quantum dot layer QDL, and a planarization process may then be performed.

Figure 30:
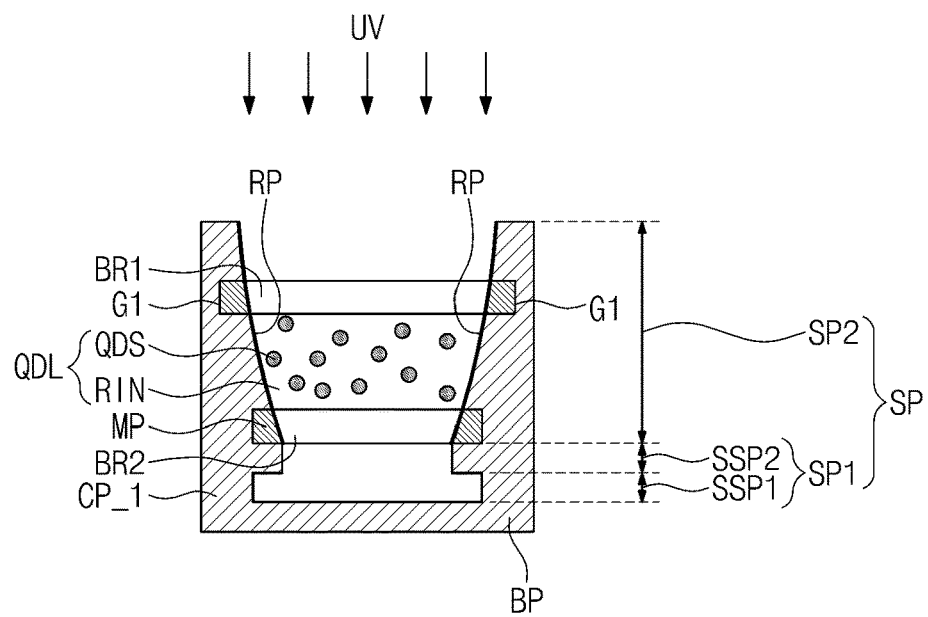

Referring to FIG. 30, a UV light is provided to the liquid second resin LR2 through the space between the second sidewall portions SP2, and the second resin LR2 is cured by the UV light. The first barrier layer BR1 may be provided by the second resin LR2 which is cured by the UV light.

The second resin LR2 may be heated when the second resin LR2 is cured by the UV light. In a case in which the metal parts MP are not disposed on the case part CP_1, the reflective parts RP disposed on the inner surfaces of the second side wall portions SP2 overlapping the second resin LR2 may be damaged by the second resin LR2.

In an exemplary embodiment of the invention, the reflective parts RP are not disposed on the inner surfaces of the second side wall portions SP2 overlapping the second resin LR2, and first grooves G1 are defined. The metal parts MP are disposed in the first grooves G1, and the first light generated from the light source units LSU may be reflected by the metal parts MP.

Figure 31:
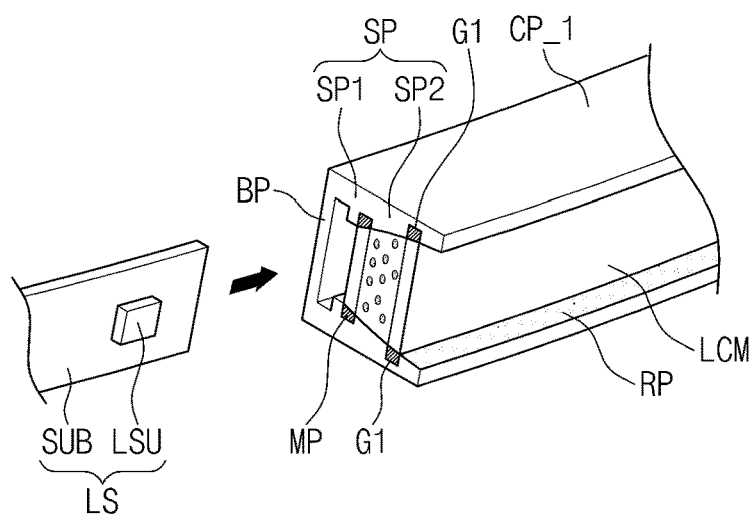

Referring to FIG. 31, the light source LS is disposed between the bottom portion BP and the first sidewall portions SP1 by being inserted into the space between the bottom portion BP and the first sidewall portions SP1.

Although not shown in the drawings, since the cover parts COP are connected to both sides of the case part CP in the first direction DR1, the cover parts COP close the space between the bottom portion BP and the sidewall portions SP in the first direction DR1.

In the another exemplary embodiment of the invention, since the second barrier layer BR2, the quantum dot layer QDL, and the first barrier layer BR1 are sequentially and easily provided, an area that is not filled with quantum dots is not generated. Since the liquid resin RIN is disposed flat and then cured to form the quantum dot layer QDL, the quantum dot layer QDL may be easily provided to a predetermined thickness.

As a result, the method of manufacturing the light generating member 140_1 according to the another exemplary embodiment of the invention may easily manufacture the light conversion member LCM which has the predetermined curvature and converts light without the area that is not filled with quantum dots.

Figure 32:
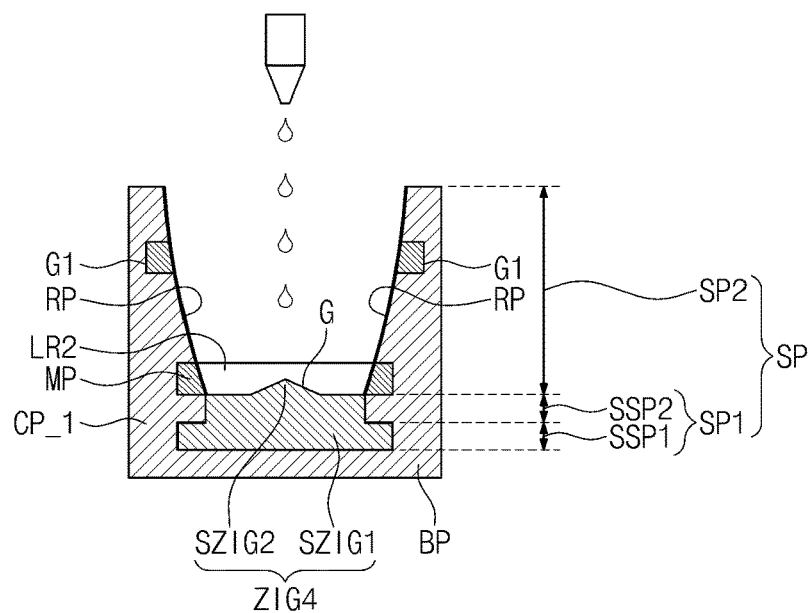
FIGS. 32 through 34 illustrate a method of manufacturing a groove of the light conversion member illustrated in FIGS. 12 through 14.
Figure 33:
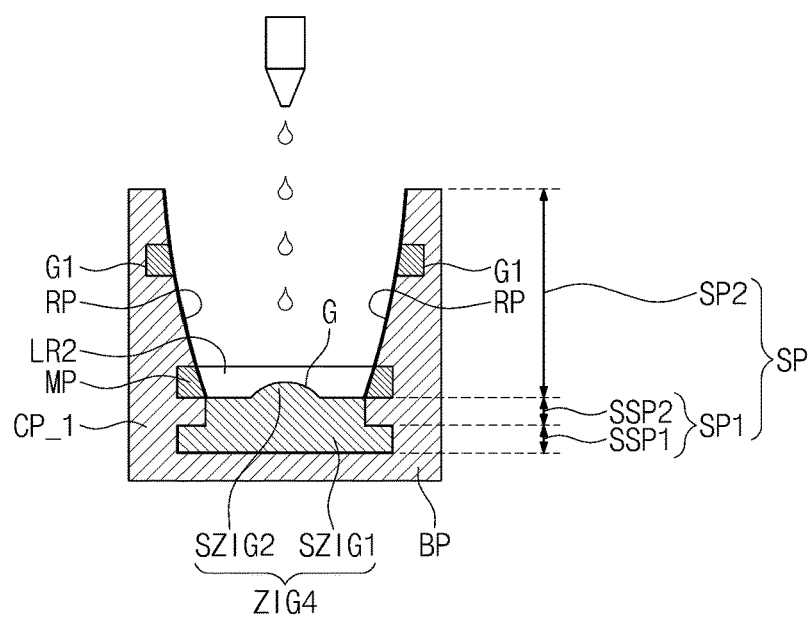
Figure 34:
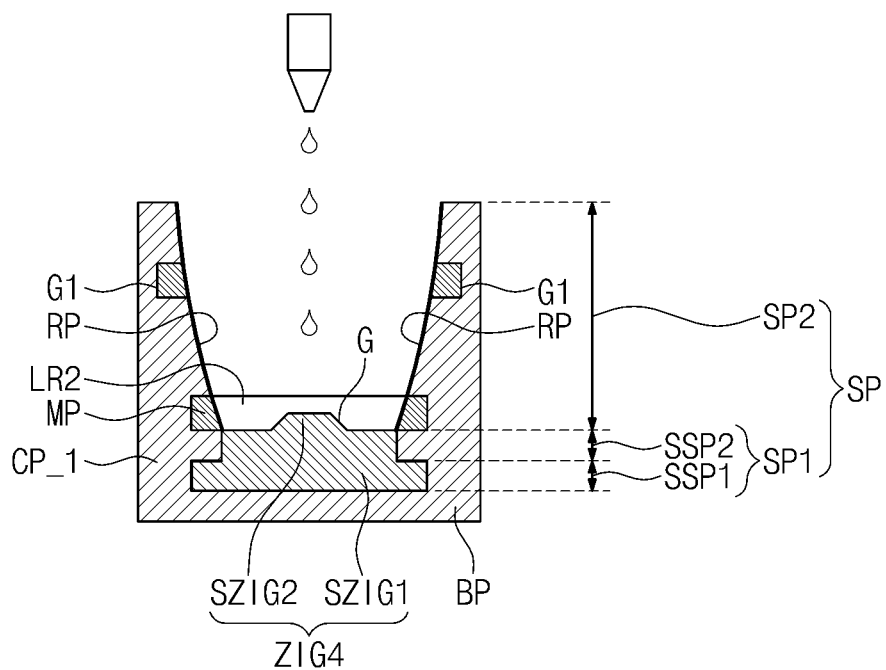

FIGS. 32 through 34 illustrate a method of manufacturing the groove of the light conversion member illustrated in FIGS. 12 through 14.

Referring to FIGS. 32 to 34, a fourth zig ZIG4 illustrated in FIGS. 32 to 34 is substantially the same as the second zig ZIG2 illustrated in FIGS. 22, 24, and 25. Thus, the fourth zig ZIG4 may include a first sub-zig SZIG1 and a second sub-zig SZIG2, and the second sub-zig SZIG2 of the fourth zig ZIG4 may have a mountain shape, a convex shape, or a trapezoidal shape.

The fourth zig ZIG4 is inserted into a space between the bottom portion BP and the sidewall portions SP through one side of the case part CP in the first direction DR1. The first sub-zig SZIG1 of the fourth zig ZIG4 is disposed between the bottom portion BP and the first sidewall portions SP1 by being inserted into a space between the bottom portion BP and the first sidewall portions SP1. The second sub-zig SZIG2 of the fourth zig ZIG4 is disposed in a predetermined region between the second sidewall portions SP2 adjacent to a boundary between the first sidewall portions SP1 and the second sidewall portions SP2.

A liquid second resin LR2 is provided on the fourth zig ZIG4 through a space between the second sidewall portions SP2. The liquid second resin LR2 may have a groove G having a V-valley shape, a concave shape, or an inverted trapezoidal shape by the second sub-zig SZIG2 of the fourth zig ZIG4. The second resin LR2 is cured by UV light, and thus, the groove G having a V-valley shape, a concave shape, or an inverted trapezoidal shape is defined in the second barrier layer BR2.

Since a process of forming the groove G illustrated in FIGS. 32 to 34 is added to the method of manufacturing the light generating member 140_1 described in FIGS. 26 to 31, the light generating member 140_1 illustrated in FIGS. 12 to 14 may be manufactured.

A light generating member according to an exemplary embodiment of the invention and a display apparatus including the same may improve display quality by preventing color stains by including a light conversion member which has a predetermined curvature and converts light without an area that is not filled with quantum dots.

Also, a method of manufacturing a light generating member according to an exemplary embodiment of the invention may easily manufacture a light conversion member which has a predetermined curvature and converts light without an area that is not filled with quantum dots.

Although the invention has been described with reference to the exemplary embodiments thereof, it will be appreciated by those skilled in the art that it is possible to modify and change the invention in various ways without departing from the spirit and scope of the invention as set forth in the following claims. In addition, the disclosed embodiments should not be construed to limit the technical idea of the invention, and the following claims and all technical ideas within the equivalents should be construed as being included in the scope of the invention.

What is claimed is:

1. A light generating member comprising:
   a light source which generates a first light;
   a light conversion member which converts the first light into a second light;
   a bottom portion which includes long sides facing each other and short sides connected to ends of the long sides to face each other;
   first sidewall portions which are connected to the long sides, extend in a direction crossing a plane of the bottom portion, are substantially normal to the plane of the bottom portion and the first sidewall portions face each other;
   second sidewall portions which are connected to the first sidewall portions and face each other; and
   cover parts which cover both sides of the first and second sidewall portions and the short sides in a first direction,
   wherein the light source is disposed between the bottom portion and the first sidewall portions, the light conversion member is disposed between the second sidewall portions, and the long sides have a predetermined curvature, the first sidewall portions are extended from edges of the bottom portion corresponding to the long sides,
   wherein the long sides are curved with the predetermined curvature and extend along the first direction, the first and second sidewall portions extend in a second direction crossing the first direction, the first and second directions defining a plane, and the short sides extend in a third direction crossing the first and second directions and substantially normal to the plane, and
   wherein each of the cover parts comprises step difference portions which are recessed by a predetermined depth toward a rear surface of the cover parts, an opposite surface of a front surface of the cover parts, in a predetermined area of the front surface of the cover parts, and
   predetermined areas of both sides of the front surface of the cover parts, which include the step difference portion disposed therebetween in the third direction, overlap one side of the second sidewall portions which is an opposite side of the other side of the second sidewall portions connected to the first sidewall portions.

2. The light generating member of claim 1, wherein the light source comprises:
   a light source substrate which is curved with the predetermined curvature and extends along the first direction; and
   a plurality of light source units which are disposed on the light source substrate, generate the first light and are arranged in a direction having the predetermined curvature along the first direction.

3. The light generating member of claim 2, wherein the first sidewall portions comprise:
   first sub-sidewall portions which are connected to the long sides and extend in the second direction; and
   second sub-sidewall portions which extend in the second direction and are connected to the first sub-sidewall portions and the second sidewall portions,
   wherein the light source substrate is disposed between the bottom portion and the first sub-sidewall portions, and the light source is disposed between the second sub-sidewall portions.

4. The light generating member of claim 3, wherein a width of the second sub-sidewall portions in the second direction is greater than a width of the plurality of light source units.

5. The light generating member of claim 3, wherein a distance between inner surfaces of the first sub-sidewall portions, which are defined as surfaces of the first sub-sidewall portions facing each other, is greater than a distance between inner surfaces of the second sub-sidewall portions, which are defined as surfaces of the second sub-sidewall portions facing each other.

6. The light generating member of claim 5, wherein the inner surfaces of the first sub-sidewall portions and the inner surfaces of the second sub-sidewall portions are disposed parallel to the second direction.

7. The light generating member of claim 1, wherein a distance between inner surfaces of the second sidewall portions, which are defined as surfaces of the second sidewall portions facing each other, increases as farther from the first sidewall portions, and the inner surfaces of the second sidewall portions have a concave curved shape along the second direction and are symmetrical to each other.

8. The light generating member of claim 7, further comprising reflective parts which are disposed on the inner surfaces of the second sidewall portions and reflect a light.

9. The light generating member of claim 1, wherein a hole is defined at a center portion of the bottom portion and penetrates through the bottom portion in the second direction.

10. The light generating member of claim 1, wherein the light conversion member is disposed lower than the step difference portions of the cover parts in a direction toward a bottom surface of the bottom portion which is an opposite surface of an inner surface of the bottom portion on which the light source is disposed.

11. The light generating member of claim 1, wherein the light conversion member comprises:
a first barrier layer;
a second barrier layer which faces the first barrier layer; and
a quantum dot layer which is disposed between the first barrier layer and the second barrier layer and converts the first light into the second light,
wherein the second barrier layer is adjacent to the light source.

12. The light generating member of claim 11, wherein a rear surface of the second barrier layer, which is opposite to the first barrier layer in the second direction, overlaps a boundary between the first side wall portions and the second side wall portions.

13. The light generating member of claim 11, wherein:
a plurality of first grooves is recessed by a predetermined depth from inner surfaces of the second sidewall portions, which are defined as surfaces of the second sidewall portions facing each other, to outer surfaces of the second sidewall portions which are opposite surfaces of the inner surfaces of the second sidewall portions; and the light generating member further comprises:
a plurality of metal parts disposed in the plurality of first grooves; and
reflective parts disposed on the inner surfaces of the second sidewall portions excluding the plurality of first grooves.

14. The light generating member of claim 13, wherein the plurality of first grooves overlaps the first and second barrier layers.

15. The light generating member of claim 1, wherein a groove recessed from a bottom surface of the light conversion member facing the light source to a top surface of the light conversion member which is an opposite surface of the bottom surface of the light conversion member is defined in the light conversion member, and the groove is curved with the predetermined curvature and extends along the first direction.

16. The light generating member of claim 15, wherein the groove has one of a V-valley shape, a concave shape, and an inverted trapezoidal shape.

17. The light generating member of claim 1, wherein the first light is blue light and the second light is white light.

* * * * *